(12) United States Patent
Sesia et al.

(10) Patent No.: US 9,258,069 B2
(45) Date of Patent: Feb. 9, 2016

(54) NON-CONTIGUOUS CARRIER AGGREGATION

(71) Applicant: ST-Ericsson SA, Plan-les-Ouates (CH)

(72) Inventors: Stefania Sesia, Roquefort les Pins (FR); Pierre Demaj, Nice (FR); Martial Gander, Les Arcs sur Argens (FR); Muhammad Kazmi, Bromma (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 127 days.

(21) Appl. No.: 14/348,627

(22) PCT Filed: Sep. 28, 2012

(86) PCT No.: PCT/EP2012/069248
§ 371 (c)(1),
(2) Date: Mar. 31, 2014

(87) PCT Pub. No.: WO2013/050307
PCT Pub. Date: Apr. 11, 2013

(65) Prior Publication Data
US 2014/0293818 A1    Oct. 2, 2014

(30) Foreign Application Priority Data

| Oct. 3, 2011 | (EP) | 11306273 |
| Oct. 7, 2011 | (EP) | 11306302 |
| Oct. 13, 2011 | (EP) | 11306329 |
| Jul. 10, 2012 | (EP) | 12175795 |

(51) Int. Cl.
*H04B 17/21* (2015.01)
*H04B 17/318* (2015.01)
*H04L 1/00* (2006.01)
(Continued)

(52) U.S. Cl.
CPC ............. *H04B 17/21* (2015.01); *H04B 17/318* (2015.01); *H04L 1/0016* (2013.01); *H04L 1/0026* (2013.01); *H04L 1/20* (2013.01); *H04W 24/08* (2013.01); *H04B 1/0082* (2013.01);
(Continued)

(58) Field of Classification Search
None
See application file for complete search history.

(56) References Cited

U.S. PATENT DOCUMENTS

| 5,493,716 A | 2/1996 | Bane |
| 5,805,989 A | 9/1998 | Ushida |

(Continued)

FOREIGN PATENT DOCUMENTS

| EP | 2120349 A1 | 11/2009 |
| EP | 2192808 A1 | 6/2010 |

(Continued)

OTHER PUBLICATIONS

Renesas Mobile Europe Ltd, "Measurement events for NC-4C-HSDPA", 3GPP TSG-RAN WG2 Meeting #xx, Athens, Greece, Aug. 22, 2011, pp. 1-4, R4-114259, 3GPP.

(Continued)

*Primary Examiner* — Min Jung
(74) *Attorney, Agent, or Firm* — Coats & Bennett, PLLC

(57) ABSTRACT

A method of operating a user equipment for measuring non-contiguous carriers comprises: changing a position of a local oscillator to be in the middle of the non-contiguous carriers; measuring the carriers simultaneously; estimating a power level of an interferer in a gap in the non-contiguous carriers which creates image interference; and compensating the measurement dependent on the interferer power level and an image rejection factor.

13 Claims, 10 Drawing Sheets

(51) Int. Cl.
*H04L 1/20* (2006.01)
*H04W 24/08* (2009.01)
*H04B 1/00* (2006.01)
*H04L 5/00* (2006.01)
*H04W 36/00* (2009.01)
*H04W 72/08* (2009.01)

(52) U.S. Cl.
CPC ........... *H04L 5/001* (2013.01); *H04W 36/0088* (2013.01); *H04W 72/085* (2013.01)

(56) References Cited

U.S. PATENT DOCUMENTS

| | | | |
|---|---|---|---|
| 7,254,197 | B2 | 8/2007 | Heo et al. |
| 7,460,850 | B2 | 12/2008 | Iwaida |
| 7,512,083 | B2 | 3/2009 | Li |
| 7,924,809 | B2 | 4/2011 | Yin et al. |
| 8,320,276 | B1* | 11/2012 | Callender ............... H04L 5/001 370/236 |
| 8,798,177 | B2* | 8/2014 | Park ..................... H04B 1/30 333/176 |
| 2004/0141466 | A1 | 7/2004 | Kim et al. |
| 2005/0181752 | A1 | 8/2005 | Sahota |
| 2006/0034244 | A1 | 2/2006 | Huang et al. |
| 2007/0184811 | A1 | 8/2007 | Ballantyne |
| 2010/0066917 | A1 | 3/2010 | Gatta et al. |
| 2010/0087152 | A1 | 4/2010 | Mourad |
| 2011/0150122 | A1* | 6/2011 | Lindoff ................. H04B 1/0003 375/285 |
| 2012/0213095 | A1* | 8/2012 | Krishnamurthy ....... H04L 5/001 370/252 |
| 2012/0230372 | A1* | 9/2012 | Park ..................... H04B 1/30 375/148 |
| 2013/0044621 | A1* | 2/2013 | Jung .................. H04W 72/082 370/252 |
| 2014/0051441 | A1* | 2/2014 | Wilhelmsson ........... H03D 7/18 455/436 |
| 2014/0192663 | A1* | 7/2014 | Rosa ................... H04W 52/244 370/252 |
| 2014/0301339 | A1* | 10/2014 | Sesia ................... H04B 1/0067 370/329 |
| 2015/0087245 | A1* | 3/2015 | Hadji-Abdolhamid H04B 1/0057 455/77 |

FOREIGN PATENT DOCUMENTS

| | | |
|---|---|---|
| GB | 2298551 A | 9/1996 |
| JP | S6460115 A | 3/1989 |
| WO | 2011089056 A1 | 7/2011 |

OTHER PUBLICATIONS

ST-Ericsson, et al., "Initial analysis of in-gap requirements for non contiguous carrier aggregation", 3GPP TSG RAN WG4 Meeting 60, Athens, Greece, Aug. 22, 2011, pp. 1-2, R4-114403, 3GPP.

Luu, L., et al., "An Adaptive Weaver Architecture Radio with Spectrum Sensing Capabilities to Relax RF Component Requirements", IEEE Journal on Selected Areas in Communications, Apr. 1, 2007, pp. 538-545, vol. 25, No. 3, IEEE.

ST-Ericsson, "Non-contiguous carrier aggregation configurations", 3GPP TSG RAN WG4 Meeting #59AH, Bucharest, Romania, Jun. 27, 2001, pp. 1-5, R4-113595, 3GPPP.

ST-Ericsson, "Non-contiguous carrier aggregation overview of UE impact", 3GPP TSG RAN WG4 Meeting #59AH, Bucharest, Romania, Jun. 27, 2001, pp. 1-9, R4-113596, 3GPP.

ST-Ericsson, "Interference handling in non-contiguous carrier aggregation", 3GPP TSG RAN WG4 Meeting 60, Athens, Greece, Aug. 22, 2011, pp. 1-8, R4-115114, 3GPP.

ST-Ericsson, "Clarification on non contiguous carrier aggregation", 3GPP TSG RAN WG4 Meeting 60, Athens, Greece, Aug. 22, 2011, pp. 1-4, R4-114400, 3GPP.

* cited by examiner

| Scenario | Band | Gap length (MHz) | Number of Carriers | Carrier Configuration |
|---|---|---|---|---|
| A | I | 5 | 2 | C-5-C |
| B | I | 5 | 3 | C-5-CC |
| C | I | 10 | 4 | C-10-CCC |
| D | IV | 5 | 2 | C-5-C |
| E | IV | 10 | 3 | C-10-CC |
| F | IV | 15 | 4 | CC-15-CC |
| G | IV | 20 | 3 | CC-20-C |
| H | IV | 25 | 4 | CC-25-CC |
FIG. 1
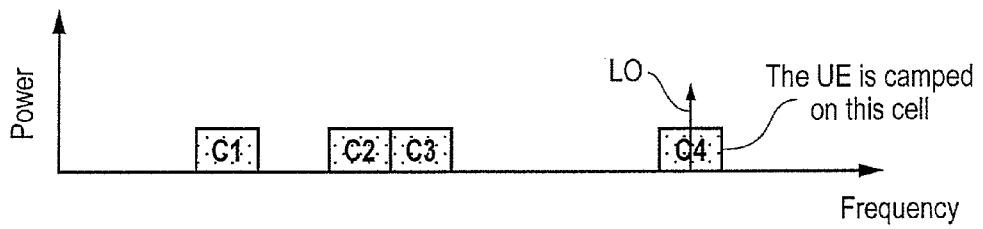
FIG. 2A
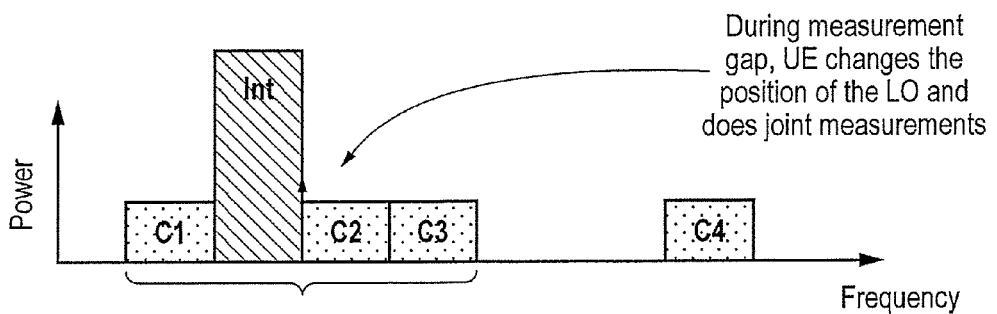
FIG. 2B

NON-CONTIGUOUS CARRIER AGGREGATION

TECHNICAL FIELD

The present disclosure relates to methods and apparatus relating to carrier aggregation in the field of wireless communication, and in particular non-contiguous carrier aggregation. The disclosure has application, in particular but not exclusively, in wireless communication systems and apparatus adapted for operation in accordance with the Third Generation Partnership Project (3GPP) Long Term Evolution (LTE) protocol, such as a user equipment and a network node.

BACKGROUND

Carrier aggregation is a technique available for increasing the bandwidth available for communication by employing simultaneously more than one carrier for communication by a single communication device. The carriers may be in different radio frequency bands, in which case they occupy portions of spectrum that are spaced apart, or may occupy contiguous portions of spectrum in a single radio frequency band, or a combination of both possibilities, occupying contiguous portions of different radio frequency bands. A further possibility is that the carriers occupy a single radio frequency band, but not all of the carriers occupy portions of spectrum that are contiguous, there being one or more gaps in the spectrum occupied by the carriers. The present disclosure addresses, in particular, such carrier aggregation in which the carriers are non-contiguous within a single frequency band.

Carrier aggregation has been introduced in release 8 of the 3GPP High Speed Downlink Packet Access protocol, commonly referred to as HSDPA. In release 8 (rel-8) of HSDPA, only two adjacent carriers can be aggregated. Release 9 (rel-9) introduces the possibility to schedule two carriers in two different bands, that is, one carrier in one band and one carrier in an other band, for example band I and band VIII. In release 10 (rel-10) up to four carriers can be aggregated which can be located in the same band, with a maximum of three adjacent carriers being considered, or in two different bands. In LTE, carrier aggregation has been introduced in rel-10. Up to rel-10, only the aggregation of contiguous portions of the spectrum is possible, within one band. With release 11 (rel-11), non-contiguous carrier aggregation is possible.

FIG. 1 illustrates some configurations of carriers which may be employed for non-contiguous carrier aggregation in the High Speed Downlink Pack Access (HSDPA) protocol. Referring to FIG. 1, eight scenarios A to H are represented, with scenarios A to C being applicable in Band I of HSDPA and scenarios D to H being applicable in Band IV of HSDPA. Each carrier occupies 5 MHz of spectrum, and the gap between those carriers that may be used for carrier aggregation is, 5 MHz, or a multiple of 5 MHz. In practice, the gaps may be occupied by carriers belonging to a different communications network. For the purpose of this document, such a carrier that occupies the gap will be referred to as an interferer, interference signal or an unwanted signal, as it carries no information intended for a receiver using the non-contiguous carriers for communication. In scenario A, two carriers separated by a 5 MHz gap are aggregated, and this configuration is denoted C-5-C. In scenario B, three carriers are aggregated with a gap of 5 MHz between the first and second carriers, which are the two carriers of lowest frequency, and this configuration is denoted C-5-CC. In scenario C, four carriers are aggregated with a 10 MHz gap between the first and second carriers, and this configuration is denoted C-10-CCC. Scenario D has an identical configuration to scenario A. Scenario E has three carriers with a 10 MHz gap between the first and second carrier, this configuration being denoted C-10-CC. Scenarios F and G both have four carriers and a central gap of 15 MHz and 20 MHz, being denoted, respectively, CC-15-CC and CC-20-CC, with the gap being between the second and third carriers. Scenario G has three carriers with a 20 MHz gap between the second and third carriers, which are the two carriers of highest frequency, and is denoted CC-20-C. Some of the configurations in FIG. 1 span 20 MHz or less, and others span more than 20 MHz.

Mobile communication networks which conform with the 3GPP LTE protocol can employ carrier spacings of 1.4, 3, 5, 10, 15 and 20 MHz, depending on the spectrum conditions and availability, and where such a network implements carrier aggregation, the gap between non-contiguous carriers can be an integer multiple of one of these spacings.

Also, user equipments (UEs) may implement both HSDPA and LTE technologies and hence reuse of the components between the two different radio access technologies (RATs) is highly desirable.

The gap between non-contiguous carriers may be occupied by a carrier transmitted by a different communication network, which may be regarded as an unwanted carrier with respect to a receiver receiving the non-contiguous carriers. Such an unwanted carrier may therefore also be regarded as an interference signal. Indeed, it is very likely that an interferer will be present in the gap. The interferer can be from a different operator that may deploy the same radio access technology (RAT) or another RAT in the gap. For example, scenario B in FIG. 1 is a typical scenario for Telecom Italia, and the gap is occupied by Vodafone. Moreover the assumption of similar power received in the wanted carrier and in the gap does hold true only when geographical co-location of the two operators is possible. This is not the case in practice for most of the operators deploying their network in the same area. So, whereas systems employing carrier aggregation may control the relative levels of the contiguous carriers, with non-contiguous carriers, the level of an interference signal in a gap may not be controllable by the system and may be relatively high.

In a wireless communication network employing carrier aggregation, the selection of carriers to be aggregated may be based on selection criterion that takes account of the signal quality of candidate carriers. For example, a mobile terminal may measure the quality of candidate carriers and report the result of the measurement to a network node, which can then employ the result in selecting the carriers to be aggregated.

In order to reduce the affect of an interference signal in a gap, a receiver may employ dual local oscillators and dual signal paths, with one local oscillator, mixer and filter being used for down-converting carriers which lie on one side of a gap, and a second local oscillator, mixer and filter being used for down-converting carriers which lie on the other side of the gap. Such a receiver can be complex, large, and have relatively high power consumption, in comparison with a receiver arranged for receiving only contiguous carriers.

In order to avoid a high complexity, increased size and higher power consumption of using dual local oscillators and dual signal paths, a receiver with a single local oscillator and single signal path may be tuned to each candidate carrier sequentially to measure signal quality. However, such a scheme can be slow, particularly where many candidate carriers are measured, or where the measurements takes place at intervals during time gaps in ongoing communication.

Consider an example for a configuration C1 x C2 C3 x x x x C4, where the UE camps on C4. For this example we make the assumption of a one LO UE. A signalling method, is summarised as follows:

1) A network node (NodeB or eNB) requests inter-frequency measurements on carriers C1, C2 and C3
2) The UE uses one measurement gap, that is, a time gap, during which it changes the position of the LO and does measurement on C1
3) The UE reports the received signal strength indicator (RSSI) and energy-per-chip to noise-plus-interference ratio (Ec/No) for C1
4) The UE uses one measurement gap during which it changes the position of the LO and does measurement on C2
5) The UE reports the RSSI and Ec/No for C2
6) The UE uses one measurement gap during which it changes the position of the LO and does measurement on C3
7) The UE reports the RSSI and Ec/No for C3

Note that each measurement is done on a 5 MHz bandwidth as it was done so far before HSDPA rel-8. With this method we need N gaps to measure each of the N carriers once.

We consider measurement methods in more detail using the example configuration C1 x C2 C3 x x x x C4 where the operator has the carriers C1, C2, C3, C4 and the UE is camped on C4. The term, 'x' denotes carriers belonging to other operators. In High Speed Packet Access (HSPA) each carrier is of 5 MHz. In LTE, the carriers can have the same or different bandwidths, for example any combination of 1.4, 3, 5, 10, 15 and 20 MHz carriers.

The signalling method used in the legacy for performing measurements on carriers on non-contiguous carrier aggregation scenario comprises:

The radio network node, for example a Radio Network Controller (RNC) in HSPA or eNodeB in LTE, requests the UE to make inter-frequency measurements on carriers C1, C2 and C3. The requirements are currently defined for two inter-frequency carriers in High Speed Packet Access (HSPA) and three inter-frequency carriers in LTE.

The UE reports the measurements for each carrier. For example, for a Universal Telecommunication System Terrestrial Radio Access (UTRA) carrier the UE reports measurements of RSSI, Common Pilot Channel (CPICH) or Received Signal Code Power (RSCP); for HSPA, the UE reports measurements of CPICH or Ec/No; for LTE, the UE reports Reference Signal Received Power (RSRP) or Reference Signal Received Quality (RSRQ).

In HSPA the UE uses one measurement gap pattern, also known as compressed mode pattern, for each carrier during which it changes the position of the LO and does a measurement on that carrier. In HSPA the UE reports the measurements on each inter-frequency carrier, for example on C1, C2 and C3, when the measurements are done.

In LTE the UE uses one measurement gap pattern for measuring on all inter-frequency carriers. During each gap, which is 6 ms, or effectively 5 ms due to frequency switching, typically a UE measures one carrier at a time. This means the UE adjusts the position of the LO to be centred on a carrier, for example C1, and does measurement on that carrier. In LTE the UE reports the measurements on each inter-frequency carrier, for example on C1, C2 and C3, when the measurements are done.

The measurements may be done by the UE on the serving as well as on neighbour cells over some known reference symbols or pilot sequences. Some measurements may also require the UE to measure the signals transmitted by the UE in the uplink. In a multi-carrier or carrier aggregation (CA) scenario, the UE may perform the measurements on the cells on the primary component carrier (PCC) as well as on the cells on one or more secondary component carriers (SCCs).

The measurements are done for various purposes. Some example measurement purposes are: mobility, positioning, self organising network (SON), minimisation of drive tests (MDT), operation and maintenance (O&M), network planning and optimisation. The measurements may also comprise cell identification, for example Physical Cell Identity (PCI) acquisition of the target cell, Cell Global Identity (CGI) or Evolved Cell Global Identity (ECGI) acquisition of the target cell, or system information acquisition of the target cell. The target cell can be of LTE or any inter-RAT cell. Examples of intra-frequency, inter-frequency and CA mobility measurements in LTE are RSRP and RSRQ. Examples of intra-frequency, inter-frequency and multi-carrier HSPA mobility measurements are: CPICH, RSCP, CPICH Ec/No and UTRA carrier RSSI. Examples of well known positioning UE measurements in LTE are Reference Signal Time Difference (RSTD) measurement and UE transmitter-receiver time difference measurement.

The measurements described above can be used to enable UE mobility. These measurements are also applicable for a UE camped on, or served by, a mobile relay.

There are two kinds of UE mobility states:

Low activity state mobility, for example cell selection and cell reselection

Connected state mobility, for example handover, cell change order, RRC connection release with re-direction, primary cell change, primary carrier change, and RRC connection re-establishment.

In LTE there is only one low activity mobility state, called idle state. In HSPA there are the following low activity states: Idle state; UTRA Registration Area Paging Channel (URA_PCH) state; Cell Paging Channel (CELL_PCH) state; and Cell Forward Access Channel (CELL_FACH) state. Nevertheless, in any low activity state the UE autonomously performs cell reselection without any direct intervention from the network. To some extent the UE behaviour in a low activity mobility state scenario could still be controlled by a number of broadcast system parameters and performance specification. In HSPA, the connected state is also known as the Cell Dedicated Channel (CELL_DCH) state since at least a dedicated channel (DCH) is in operation for at least the maintenance of the radio link quality.

Handover, on the other hand, is fully controlled by the network through explicit UE specific commands and by performance specification. Similarly the Radio Resource Control (RRC) re-direction upon connection release mechanism is used by the network to re-direct the UE to change to another cell, which may belong to the RAT of the serving cell or to another RAT. In this case the UE upon receiving the 'RRC re-direction upon connection release' command typically goes into an idle state, searches for the indicated cell or RAT, and accesses the new cell or RAT.

In both the low activity state and the connected state the mobility decisions are mainly based on the same kind of downlink neighbour cell measurements, which are described above.

Both Wideband Code Division Multiple Access (WCDMA) and Evolved UTRA Network (E-UTRAN) are frequency reuse-1 systems. This means the geographically closest or physical adjacent neighbour cells operate on the same carrier frequency. An operator may also deploy multiple frequency layers within the same coverage area. Therefore, idle mode and connected mode mobility in both WCDMA and E-UTRAN could be broadly classified into three main categories:

Intra-frequency mobility (low activity and connected states)

Inter-frequency mobility (low activity and connected states)

Inter-RAT mobility (low activity and connected states)

In intra-frequency mobility, the UE moves between the cells belonging to the same carrier frequency. This is the most important mobility scenario since it involves less cost in terms of delay as mobility measurements can be carried out in parallel with channel reception. In addition, an operator would have at least one carrier at its disposal that it would like to be efficiently utilised.

In inter-frequency mobility, the UE moves between cells belonging to different carrier frequencies but of the same access technology. This could be considered as the second most important scenario.

In inter-RAT mobility, the UE moves between cells that belong to different access technologies such as between WCDMA and Global System for Mobile Communication (GSM) or vice versa, or between WCDMA and LTE or vice versa.

The most straightforward approach for receiving non-contiguous carriers is to use two separate receivers. However, there would be a cost benefit in facilitating a single-receiver UE implementation, for example, enabling re-use of LTE components and avoiding activating a second chain for configurations that could be supported with a single receiver. One possibility may be for operator A and operator B to perform some kind of joint coverage planning. Hence there may be prior knowledge that the situation of a relatively high power interferer in a gap between two non-contiguous carriers cannot occur. To allow this, it would seem necessary to specify the maximum power difference between wanted and unwanted carriers that can be tolerated by a single-receiver UE. In practice, it is only likely that this option can be considered if operator A and operator B cell sites are completely shared, so it does not cover all likely cases. Another approach would be to use network radio resource management (RRM) strategies to attempt to detect and avoid such a scenario. For example, the UE could be configured to two-carrier (2C) or single-carrier (1C) operation in locations where the operator B signal was too strong to allow non-contiguous four-carrier HSDPA (NC-4C-HSDPA) operation.

It could be beneficial for the UE to report that there is an imbalance condition RSCP, may not be suitable for this purpose, partly because operator A cannot provide to UEs, or know, a neighbour cell list for the operators on operator B spectrum, and partly because carrier RSSI rather than RSCP would be the relevant metric, especially as operator A is unaware of the loading of cells on operator B's spectrum. The carrier RSSI is measured over the entire carrier and not on a specific cell. Hence the UE does not require knowledge of the Physical Cell Identifier (PCI) or scrambling code used in the cells on the carrier.

Although inter-frequency detected set measurements of operator B's carrier could be considered, that is, measurements related to a carrier belonging to the detected or detectable set of carriers of operator B, the reporting of only one cell and the fact that load is unknown would be a significant limitation. A Channel Quality Indicator (CQI) of the serving cell may also give an indication of the presence of an interferer. However, the CQI is a short term metric and would require further averaging, for example in eNB, that is, eNodeB, to reflect the long term situation. This may delay the decision of the eNB to revert to an easier configuration, such as two carriers or a single carrier, which may cause some throughput degradation and some losses. Additionally, Iub interface changes may be needed to provide information to the RNC to trigger mobility procedures based on CQI. The Iub interface connects a Radio Network Controller (RNC) to a Node B base station.

Periodic inter-frequency RSSI reporting may be configured using existing measurement configuration mechanisms. Some possible issues are the number of carriers that can be monitored by the UE at the same time and the use of a maximum number of compressed mode gaps for the measurements. More significantly, the reporting rate in case of periodic reporting may need to be quite high to ensure a fast enough response to changing interference conditions to avoid call drop. The high reporting rate causes a high overhead in RRC signalling.

SUMMARY

According to a first aspect there is provided a method of operating a user equipment for measuring non-contiguous carriers, the method comprising:

changing a position of a local oscillator to be in the middle of the non-contiguous carriers;

measuring the carriers simultaneously;

estimating a power level of an interferer in a gap in the non-contiguous carriers which creates image interference; and compensating the measurement dependent on the interferer power level and an image rejection factor.

Therefore, a simple receiver architecture employing a single local oscillator may be used, measurement can be faster by measuring a plurality of carriers simultaneously, and the measurements may be more reliable by compensating to take account of interference and the receivers image rejection capability.

The compensating may be conditional on the interferer power being less than a first threshold. This can reduce processing.

The measuring may comprise calculating a joint power and energy-per-chip to noise-plus-interference ratio for the carriers, and computing a per-carrier power and energy-per-chip to noise-plus-interference ratio. This can enable compatibility with networks that employ per-carrier measurements.

The estimating may comprise estimating the power level of the interferer which creates the image interference and computing a level of the image interference in one of the carriers, and the compensating may comprise subtracting the level of the image interference from the per-carrier power and noise-plus-interference of the one of the carriers. In this way, allowance may be made for the level of interference.

The compensating may be conditional on a ratio of the interferer power to the per-carrier power of the one of the carriers being less than a second threshold. This can reduce processing.

The method according to the first aspect may comprise: computing a difference between a signal-to-noise ratio of the one of the carriers and an ideal signal-to-noise ratio of the one of the carriers with the image interference removed; mapping the difference into a channel quality indicator, CQI, table to find an ideal CQI value the UE would support if the interferer was not there; and informing a NodeB about a difference between a realistic CQI value and the ideal CQI value. This can provide additional information for a network to use when selecting carriers.

Informing the NodeB may comprise reporting a realistic CQI value and the ideal CQI value when requested by the NodeB. This can reduce signalling.

The realistic CQI value and the ideal CQI value may be multiplexed using code division multiplexing. The realistic CQI value and the ideal CQI value may be multiplexed using time division multiplexing. This can provide efficient transmission.

The method according to the first aspect may comprise measuring the carriers simultaneously during one measurement gap. This can enable fast measurements.

The method according to the first aspect may be performed responsive to a request for measurement received from a/the NodeB. This can reduce processing by avoiding unnecessary measurements. The method according to the first aspect may be performed autonomously by the UE. This can provide transparency to the network.

According to a second aspect there is provided a user equipment arranged to operate in accordance with the first aspect.

According to a third aspect there is provided a method of operating a user equipment, UE, comprising signalling to a network node a capability of the UE to perform measurements in a non-contiguous carrier aggregation measurement mode by measuring at least one of at least two non-contiguous carriers using a common radio frequency, RF, front end and a local oscillator centred over a bandwidth spanning a block of non-contiguous carriers. This enables the network to match required measurements to the capability of the UE.

The signalled capability may indicate that the at least two non-contiguous carriers can be measured at the same time. The signalled capability may indicates that the at least two non-contiguous carriers can be measured using a single measurement gap pattern. These features enable faster operation.

The signalled capability may indicate that the UE can measure in the non-contiguous carrier aggregation measurement mode when configured in a single carrier mode. This enables preparation for operation in a non-contiguous carrier aggregation mode.

The signalled capability may indicate that the UE can measure in the non-contiguous carrier aggregation measurement mode when configured in a single carrier mode in a carrier belonging to a non-contiguous block of carriers. This increases the number of configurations a UE can prepare for operation in.

The signalled capability may indicate that the UE can measure in the non-contiguous carrier aggregation measurement mode when configured in one of a dual carrier mode or multi-carrier mode.

The signalled capability may indicate that the UE can measure in the non-contiguous carrier aggregation measurement mode when configured in non-contiguous carriers. This can improve the operation of handover.

The signalled capability may comprise at least one of:
a size of non-contiguous block of spectrum over which the UE can configure the RF front end when measuring carriers;
a number of carriers that can be measured in a non-contiguous block of spectrum;
type of measurements which can be performed by the UE; and
an indication of whether the UE needs gaps for the measurements.

The method according to the third aspect may comprise signalling proactively to the network node the capability of the UE to perform measurements in the non-contiguous carrier aggregation measurement mode. This enables the network to maximise the use of the capability of the UE.

The method according to the third aspect may comprise reporting its carrier frequency specific autonomous measurement gap capability at least one of: during initial setup; during call setup; during cell change; and periodically.

The method according to the third aspect may comprise signalling to the network node, in response to a request from the network node, the capability of the UE to perform measurements in the non-contiguous carrier aggregation measurement mode. This can reduce signalling.

The method according to the third aspect may comprise receiving a measurement configuration from the network node, performing measurements in accordance with the received configuration, and reporting the measurement results to the network node.

According to a fourth aspect there is provided a user equipment, UE, arranged to operate in accordance with the third aspect.

According to a fifth aspect there is provided a method of operating a network node, comprising configuring a user equipment, UE, to perform a measurement in a non-contiguous carrier aggregation measurement mode.

The configuring may be in response to receiving from the UE a report of measurement capability and the configuring may comprise using the received report of measurement capability to select parameters for a measurement configuration and sending a request for a measurement to the UE.

The configuring may comprise sending information of at least one of:
a size of a non-contiguous block of spectrum over which the UE configures its radio frequency, RF, front end when measuring carriers;
a number of carriers to be measured in a non-contiguous block of spectrum;
channel numbers of carriers to be measured;
a type of measurement for each carrier;
a format of reported results;
whether the UE should report a measurement result to the network node;
whether the UE should report the measurement result to another network node;
a reporting mechanism, being one of periodical, event triggered and event-triggered periodical;
a gap pattern to be used for measuring carriers in a non-contiguous block of spectrum;

The method according to the fifth aspect may comprise receiving a measurement report of the measurement from the UE and selecting at least one carrier for scheduling data to the UE based on the measurement report.

According to a sixth aspect there is provided a method of operating a network node, comprising receiving, from a user equipment, capability information indicating a capability of the user equipment to perform measurements in a non-contiguous carrier aggregation measurement mode and forwarding the received capability information to another network node.

According to a seventh aspect there is provided a network node arranged to operate in accordance with the fifth aspect.

According to an eighth aspect there is provided a network node arranged to operate in accordance with the sixth aspect.

According to a ninth aspect, there is provided a wireless communication apparatus comprising:
a receiver front end arranged to receive a radio frequency (RF) signal comprising simultaneously a plurality of carrier signals at different frequencies and an interference signal, wherein two of the carrier signals are separated in the frequency domain by the interference signal;
a mixer arranged to mix the RF signal down to an intermediate frequency (IF) signal; and
a quality assessment stage arranged to
determine from the IF signal a quality of at least one of the carrier signals and a signal strength of the interference signal, and
generate an indication of carrier signal quality dependent on the determined quality of the at least one of the carrier signals and on the determined signal strength of the interference signal.

According to a tenth aspect there is provided a method of operating a wireless communication apparatus comprising:
receiving an RF, signal comprising simultaneously a plurality of carrier signals at different frequencies and an interference signal, wherein two of the carrier signals are separated in the frequency domain by the interference signal;
mixing the RF signal down to an IF signal;
determining from the IF signal a quality of at least one of the carrier signals and a signal strength of the interference signal; and
generating an indication of carrier signal quality dependent on the determined quality of the at least one of the carrier signals and on the determined signal strength of the interference signal.

Therefore, a plurality of carrier signals at different frequencies, and an interference signal in a gap between two of the carrier signals, that is, non-contiguous carrier signals, are received simultaneously as an RF signal and mixed down to an IF signal. A quality of at least one of the carrier signals, which may be one of the two carrier signals spaced apart by the gap or another of the carrier signals, and a signal strength of the interference signal, are determined from the IF signal. The signal strength of the interference signal, or interferer, may be represented by a power level. An indication of carrier signal quality is generated which is dependent on the determined quality of the at least one of the carrier signals and on the determined signal strength of the interference signal.

By mixing down the plurality of carrier signals at different frequencies and the interference signal simultaneously to an IF signal, only a single local oscillator signal and signal path is required, enabling the wireless communication apparatus to have a low complexity, small size and low power consumption. Moreover, quality assessment can be faster, by processing a plurality of carrier signals simultaneously. Therefore, this enables the carrier signals to be measured simultaneously, as in the method according to the first aspect.

In a wireless communication network employing carrier aggregation, the selection of carriers to be aggregated may be based on a selection criterion that takes account of signal quality of candidate carriers. Interference from an unwanted signal in a gap between non-contiguous carriers can affect the signal quality of candidate carriers, and can also cause an assessment of signal quality to be unreliable. By making the indication of carrier signal quality dependent on the signal strength of the interference signal, the indication of carrier signal quality can be more reliable, thereby enabling the selection of carriers to be improved.

The indication of carrier signal quality may be dependent on an image rejection ratio of the wireless communication apparatus, also referred to as an image rejection factor in the method according to the first aspect. More particularly, the indication of carrier signal quality may be dependent on the determined quality of the at least one of the carrier signals, compensated by an amount dependent on the determined signal strength of the interference signal and the image rejection ratio of the wireless communication apparatus. These features enables the indication of carrier signal quality to be more reliable by taking account of the image rejection capability of the wireless communication apparatus, which can also enable the selection of carriers to be improved. This compensating corresponds to compensating the measurement in the method according to the first aspect.

The indication of carrier signal quality may comprise a first indicator dependent on the determined quality of the at least one of the carrier signals and a second indicator dependent on the determined signal strength of the interference signal and the image rejection ratio of the wireless communication apparatus. This enables the indication of carrier signal quality to convey information for assessing the impact of the interference signal on the carrier signals, which can also enable the selection of carriers to be improved. This second factor may correspond to the level of the image interference in one of the carriers computed in the method according to the first aspect.

The second indicator may be indicative of a predicted quality of the at least one of the carrier signals if the interference signal were to be removed. Alternatively, the second indicator may be indicative of a predicted change in quality of the at least one of the carrier signals if the interference signal were to be removed. These features enables the indication of carrier signal quality to convey the impact of the interference signal on the carrier signals, which can also enable the selection of carriers to be improved. This predicted quality may correspond to, in the method according to the first aspect, the ideal signal-to-noise ratio of the one of the carriers with the image interference removed. Likewise, this predicted change in quality may correspond to, in the method according to the first aspect, the difference between a signal-to-noise ratio of the one of the carriers and the ideal signal-to-noise ratio of the one of the carriers with the image interference removed.

The determined quality of the at least one of the carrier signals may comprise an indication of received signal strength of the at least one of the carrier signals. Alternatively, the determined quality of the at least one of the carrier signals may comprise an indication of a signal-to-noise ratio of the at least one of the carrier signals. These features enable the determination of quality to be performed in a low complexity manner. The noise component of such a signal-to-noise ratio may include receiver noise, interference due to the interference signal or other received interference, distortion, and any other unwanted energy that can degrade the carrier signals.

The wireless communication apparatus may comprise a look-up table for mapping the determined quality of the at least one of the carrier signals to an indication of an error rate of symbols carried by the at least one of the carrier signals, and the indication of carrier signal quality may comprise the indication of the error rate. Likewise, the method according to the tenth aspect may comprise mapping the determined quality of the at least one of the carrier signals to an indication of an error rate of symbols carried by the at least one of the carrier signals by means of a look-up table, and generating the indication of carrier signal quality dependent on the indication of the error rate. This feature enables compatibility with another apparatus that operates using an indication of carrier signal quality of symbols carried by the at least one of the carrier signals. For example, where the wireless communication apparatus is a mobile communication terminal which transmits the indication of carrier signal quality to a mobile communication network node for carrier selection, this feature can enable the mobile communication terminal to be compatible with nodes that require the indication of carrier signal quality to be an indication of quality of reference symbols carried by the at least one of the carrier signals. An example of such an indication of quality of reference symbols is the channel quality indicator, CQI, in the 3GPP LTE protocol, where the reference symbols are pilot symbols of predetermined value. This feature can also enable fast determination of such an indication of quality of symbols, without entailing a delay while sufficient of the symbols are received, demodulated, and averaged to establish an error rate. The look-up table, therefore, may correspond to the CQI table of the method according to the first aspect, in which case the indication of error rate of symbols may be a CQI value.

The wireless communication apparatus may comprise a local oscillator arranged to generate a local oscillator signal at a local oscillator frequency, the mixer may be arranged to mix the RF signal down to the IF signal by multiplying the RF signal by the local oscillator signal, and the local oscillator frequency may be selectable to position the local oscillator frequency centrally between a lowest frequency one of the carrier signals and a highest frequency one of the carrier signals. Likewise, the method according to the tenth aspect may comprise generating a local oscillator signal at a local oscillator frequency, mixing the RF signal down to the IF signal by multiplying the RF signal by the local oscillator signal, and selecting the local oscillator frequency to position the local oscillator frequency centrally between a lowest frequency one of the carrier signals and a highest frequency one of the carrier signals. This feature can enable the frequency of an image signal to be controlled, and thereby reduce the impact of the interference signal. Positioning the local oscillator frequency centrally between the lowest frequency one of the carrier signals and the highest frequency one of the carrier signals may correspond to, in the method according to the first aspect, changing a position of the local oscillator to be in the middle of the non-contiguous carriers.

The receiver front end may comprise a first filter having a passband which is adaptable to encompass both the plurality of carrier signals and the interference signal. Likewise, the method may comprise adapting a passband of a first filter to encompass both the plurality of carrier signals and the interference signal. This feature can enable a low complexity receiver. In particular, allowing the interference signal to pass through the first filter enables the complexity of removing the interference signal to be avoided.

The wireless communication apparatus may comprise a second filter arranged to separate from the IF signal each of the carrier signals and the interference signal. Likewise, the method according to the tenth aspect may comprise separating from the IF signal each of the carrier signals and the interference signal. By separating the signals, and in particular separating the interference signal, enables the impact of the interference signal on the carrier signals to be assessed.

The wireless communication apparatus may comprise a transmitter arranged to transmit the indication of carrier signal quality. Likewise, the method according to the tenth aspect may comprise transmitting the indication of carrier signal quality. This feature enables a remote apparatus, such as a mobile communication network node, to employ the indication of carrier signal quality when selecting carrier signals for use in carrier aggregation. Transmitting the indication of carrier signal quality may correspond, for example, to, in the method according to the first aspect, informing a NodeB about a difference between a realistic CQI value and an ideal CQI.

The quality assessment stage may be arranged to determine the signal strength of the interference signal and to generate the indication of carrier signal quality in response to a received instruction to determine the quality of the at least one of the carrier signals. Likewise, the method according to the tenth aspect may comprise determining the signal strength of the interference signal and generating the indication of carrier signal quality in response to a received instruction to determine the quality of the at least one of the carrier signals. This feature can enable quality assessment to be performed only when required by an external apparatus, thereby reducing power consumption. The received instruction may correspond to, in the method according to the first aspect, a request for measurement received from a NodeB.

The quality assessment stage may be arranged to determine from the IF signal the quality of the at least one of the carrier signals and the signal strength of the interference signal in one measurement gap. Likewise, the method according to the tenth aspect may comprise determining from the IF signal the quality of the at least one of the carrier signals and the signal strength of the interference signal in one measurement gap. This feature can provide faster measurement.

BRIEF DESCRIPTION OF THE DRAWINGS

Preferred embodiments will now be described, by way of example only, with reference to the accompanying drawings, in which:

FIG. 1 illustrates examples of carrier configurations;
FIGS. 2A and 2B illustrate a carrier scenario.

DETAILED DESCRIPTION

Measurement

Figure 3:
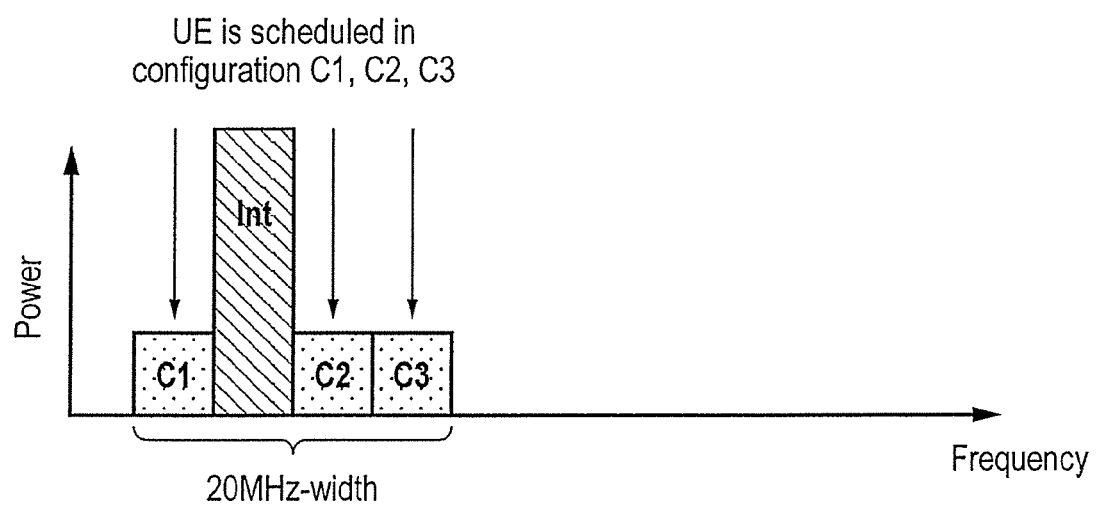
FIG. 3 illustrates another carrier scenario.

In circumstances where the non-contiguous carriers span less than about 20 MHz, it may be beneficial to allow the UE to use a single receiver structure, that is, to consider a single local oscillator and receiving the complete 20 MHz wide configuration with a single receiver, that is, with a single radio frequency (RF) architecture. An alternative solution is to consider an architecture based on dual local oscillators (LOs). However this may be complex and may increase the current consumption.

When a strong interferer is located in the gap between non-contiguous carriers, two effects should be considered:
1. The UE working with a single LO will consider this interferer as wanted signal, that is, the analog front-end filter will not filter this out.
2. The image effect which may affect one of the carriers, depending on the position of the LO. In general it is located in the middle of the total RF bandwidth.

The image effect is present when asymmetric scenarios are considered. In case of symmetric scenarios, such as a scenario CxC, this effect won't be present if the position of the LO is in the middle of the total RF bandwidth. The first effect, referred to herein as the 'filtering effect', is present irrespective of the scenario.

Considering the filtering effect only, in the symmetric scenario, possibly a reduction of the maximum level of interference which compensates for the absence of the analogue filter attenuation is needed compared to the legacy single carrier case. If the channel selectivity filter is implemented using an analogue filter only, a substantial relaxation is needed, and/or the low pass filter has to be accompanied by a notch filter that attenuates the interferer. If on the other hand the selectivity filter is a combination of analogue and digital filtering, the amount of needed relaxation may be significantly reduced, since the digital filtering can still be applied similar to the contiguous carrier case.

Consider a scenario CxCC. Under this asymmetric scenario the image problem needs to be considered. An image rejection of 25 dB can be considered, hence the power in the wanted carrier will become $$P' = 10^{\frac{Pwanted}{10}} + 10^{\frac{Pinterf - 25}{10}} \quad (1)$$

where Pwanted is the power of the wanted carrier, in dB, and Pinterf is the power of the interferer, also in dB. Of course this model is not accurate as the image will not affect all the frequencies in the wanted carrier in the same way, however we think that this analysis can provide initial guidelines.

Under the conditions specified in the 3GPP specification 25.101 the Pint-25 becomes dominant:

In ACS Case 1, $P_{int}$-25=-52-25=-77 dBm, and $P_{wanted}$=REF$\hat{I}_{or}$+14

In ACS Case 2, $P_{int}$-25=-25-25=-50 dBm, and $P_{wanted}$=REF$\hat{I}_{or}$+41 where ACS is the Adjacent Channel Selectivity test defined in 3GPP TS 25.101 (Case 1 or Case 2) where REF $\hat{I}_{or}$ is the reference $\hat{I}_{or}$, and $\hat{I}_{or}$ is the received power spectral density, integrated in a bandwidth of (1+α) times the chip rate and normalised to the chip rate, of the downlink signal as measured at the UE antenna connector, where a is the roll off factor of the low pass selectivity filter which is a root raised cosine filter. Note that for Multi-Carrier-HSDPA (MC-HSDPA), $\hat{I}_{or}$ is defined for each of the cells individually and is assumed to be equal for both cells unless explicitly stated per cell. If Band I is considered, the REF$\hat{I}_{or}$ is −106.7 dBm, hence $P_{wanted}$=−92.7 dBm for Case 1 and $P_{wanted}$=−65.7 dBm for Case 2. This shows that the image problem becomes dominant. The selectivity requirements may still be met, however the UE may not be able to fulfill the bit error rate (BER) requirements defined in the specification.

One solution could be to increase the Pwanted value such that the image becomes less dominant, that is, the offset value for the wanted power would be >>29.7 for Case 1 and >>56.7 for Case 2. The second alternative would be to reduce drastically the interferer level. Both the above-mentioned alternatives could be used.

In the following description a UE with one LO only is assumed, unless stated otherwise. Of course having several LOs, or even several independent receivers, would help solve most of the issues, but this solution has high costs, being more expansive, more complex and having a higher size.

It is desirable for a UE to support the configurations spanning less than or equal to 20 MHz with only one receiver, even in the presence of a dual receiver, to reduce power consumption. Hence it is important to provide methods that allow the UE to obtain reasonable performance when possible with a single receiver only. It is also desirable that these methods are transparent with respect to the architecture, and that a UE using two or more receivers may apply the same techniques. Considering inter-frequency measurements, a legacy procedure is based on the usage of down link (DL) compressed mode gap. During these gaps, DL service is interrupted and UEs switch frequency and measure other carriers. The more carriers, the longer it takes for the UEs to measure all of them, or the higher is the number of compressed mode gaps required. This is something that can be improved.

On top of this, there are some requirements on the measurement quality of, for example, RSSI and Ec/No. If these requirements are not met, the call drop occurrence will arise in mobility scenarios. Among the measurement requirements, we find:

the reporting rate needs to be high enough to allow efficient hand-overs the measurement accuracy must be adequate.

Consider an example having the configuration C1 x C2 C3 x x x x C4, where a UE camps on C4. For this example we still make the assumption of a one LO UE. A new method may be summarised as follows:

Assume that C1, C2, C3 are part of a list of cells to be measured. The UE uses one measurement gap during which it changes the position of the LO and does measurement on C1, C2 and C3 together.

The UE calculates the joint-like RSSI and Ec/No for C1, C2 and C3 in this example opening a joint 4*5 MHz measurement window.

Depending on the signalling provided by the NodeB the UE a) Performs a RSSI and Ec/No de-biasing in case the NodeB requires single carrier measurement (Embodiment 1)

b) Does not perform any de-biasing in case the NodeB requires joint type of measurement in view of a non-contiguous carrier aggregation allocation (Embodiment 2).

This technique may allow a reduction in the number of measurement gaps needed to monitor a certain number of inter-frequency carriers or, by keeping the same number of measurement gaps, allow improvement in the quality of the reported measurement, and hence improve the scheduling quality in the NodeB which translates into an improved system performance.

A difference with the legacy method is that a multi-carrier capable UE has already all the hardware and software (HW/SW) embedded to work on a more than 5 MHz bandwidth. As a consequence, in one gap we can measure K carriers simultaneously. This gives at least two opportunities:

The NodeB, or evolved NodeB (eNodeB), may reduce the gap occurrence, thus reducing DL service interruption The UE may take benefit from "free" additional carrier measures to filter them in order to improve their accuracy.

Consider another example (Embodiment 3) in which the UE is already scheduled under non-contiguous carrier aggregation on C1, C2 and C3 and needs to monitor its quality depending on the presence of a strong interferer. A legacy UE would report a single/independent CQI on each carrier. The CQI will follow the fading behaviour and it reflects the presence of the interferer in the gap. In order to use the legacy CQI in order to detect the presence of the interferer, the NodeB would need to perform an average of the CQI and extract the median CQI value per carrier in order to average out the fading component. This process may introduce a high latency, especially in case of a high coherence time, resulting from a low Doppler frequency, that is, low speed. This issue is addressed as follows.

The NodeB triggers the report of an additional CQI-like feedback computed on carriers C1, C2 and C3. The UE, but not the NodeB, has the information about
  Whether or not there is an interferer in the gap
  Whether or not this interferer has an effect
The UE computes the ideal CQI value which it would support if the interferer was not there. In case the UE has two LOs, the realistic CQI would be equal to the ideal CQI, which means that there is no impact on the receiver. In case the UE has one LO but no interferer is present, the realistic CQI would be equal to the ideal CQI, which means that there is no impact on the receiver. In the case the UE has one LO and there is an interferer present, the NodeB is informed about the difference between the realistic CQI and the ideal CQI, and the NodeB can take actions and re-optimize the scheduling if necessary. In each case, the UE will report two CQI values for each carrier when requested by the NodeB.

The following paragraphs provide a more detailed description. We still mainly consider a one LO UE for the following description. Referring to the scenario illustrated in FIG. 2A, the UE is initially camped on carrier C4:
  When the UE receives a request for measurement from the eNB for either C1, C2 or C3:
  It waits for one measurement gap during which it does several carrier measurement simultaneously C1, C2 and C3 rather than in a single carrier manner.
  During the measurement gap it changes the position of the LO to be in the middle of the configuration requested by the eNB, as illustrated in FIG. 2B.
  The UE computes the per-carrier RSSI and Ec/No for the carriers C1, C2, and C3 which are wanted carriers or inter-frequency carriers from the same operator.
  The UE also computes an RSSI on the interferer carrier "Int", which is from another operator, and which will be used for additional post-processing.
The UE may decide autonomously to exploit its multi-carrier capabilities to optimise legacy inter-frequency measurement gaps even in cases when the NodeB does not want to activate the non-contiguous carrier aggregation feature for this UE. This has the advantage of:
  either reducing the number of compressed mode gaps needed for measuring a given set of inter-frequency carriers, thus reducing the DL serving cell service interruption, hence improving a user's experience, for example, throughput,
  or, if we want to keep the legacy unchanged, that is, keep the same number of compressed mode gaps, a better quality of measurement reporting thanks to possible averaging for at least some carriers, which is more robust to fading and noise, keeping unchanged the legacy reporting rate to NodeB, several carriers being considered in the same compressed mode gap. The following filtering options are possible:
    1. One solution would be to consider a first order infinite impulse response (IIR) filter.
    2. One solution could be median filtering.
In both cases anyway, the filter bandwidth, determined by filtering coefficients or number of taps, may depend on RSSI and Ec/No algorithm accuracy. A compromise has to be found between accuracy after filtering and early detection of a carrier signal-to-noise ratio (SNR) change.

In the following paragraphs a de-biasing algorithm for Embodiment 1 is described.

From the NodeB point of view, reported measures of RSCP, RSSI and Ec/No should be in the same scale and perfectly comparable whether they are done on one carrier only or on several at the same time if they are contiguous. This may require some compensation, for example in the case one LO only is available in the receiver and the UE is experiencing the image rejection problem, that is, a carrier interferes with another contiguous one due to the image issue.

This interference would not have been observed in case the carrier was measured alone during the transmission gap because the LO would have been centred in the middle of the carrier of interest, and the interference mostly rejected out of the band of interest. The image rejection problem can make an RSSI appear higher than it is actually, Ec/No worse than it would have been if measured on 5 MHz only using a legacy method. We at least need to compensate the inference rejection in the contiguous carrier. This can be done by first estimating the power level of the carrier which creates image interference, that is, the RSSI of the interfering carrier. Then several criteria can be checked to decide whether compensation should be done or not:
  In a first method one could compare the RSSI_int (from interferer) to a threshold T1 (for example −110 dBm) and state that if RSSI_int<T1 no compensation is needed else compensation is needed.
  In a second method, one could compare RSSI_int with RSSI(Ci), that is interferer power to carrier of interest power and state that if RSSI_int/RSSI(Ci)<T2 no compensation is needed else compensation is needed.
A combination of, or variants of, these two methods may be used.

The compensation is then a function of the interfering carrier power RSSI_int and the image rejection factor: we should subtract image interference from RSSI(Ci) and No calculated on a carrier of interest. This consists of applying the image rejection equation provided in equation (1). By doing so we can work with RSSI, Ec/No and RSCP values that are totally comparable whether they are calculated on one carrier alone or on several carriers during the same transmission gap. The method may be based on UE initiative and the compensation described above allows not to change anything in the NodeB algorithms under Embodiment 1.

Under Embodiment 2 the UE does not need to perform any special algorithm, the RSSI and Ec/No already provide the correct information for the NodeB which scheduled the joint measurement in view of a non contiguous carrier aggregation activation.

Under Embodiment 3 the UE is already scheduled under non-contiguous carrier aggregation and it needs to monitor the quality of the carriers, as illustrated in FIG. 3. One option would be to re-use a legacy CQI that is provided per carrier. A CQI is a measure of the capability of the receiver to decode and demodulate a certain modulation and coding scheme (MCS). The CQI is reported per carrier, and is based on the CPICH SNR, but it takes into account the UE implementation. This measurement could be well suited in order to provide information to the NodeB about the impact of the interferer into some of the component carriers.

Figure 4:
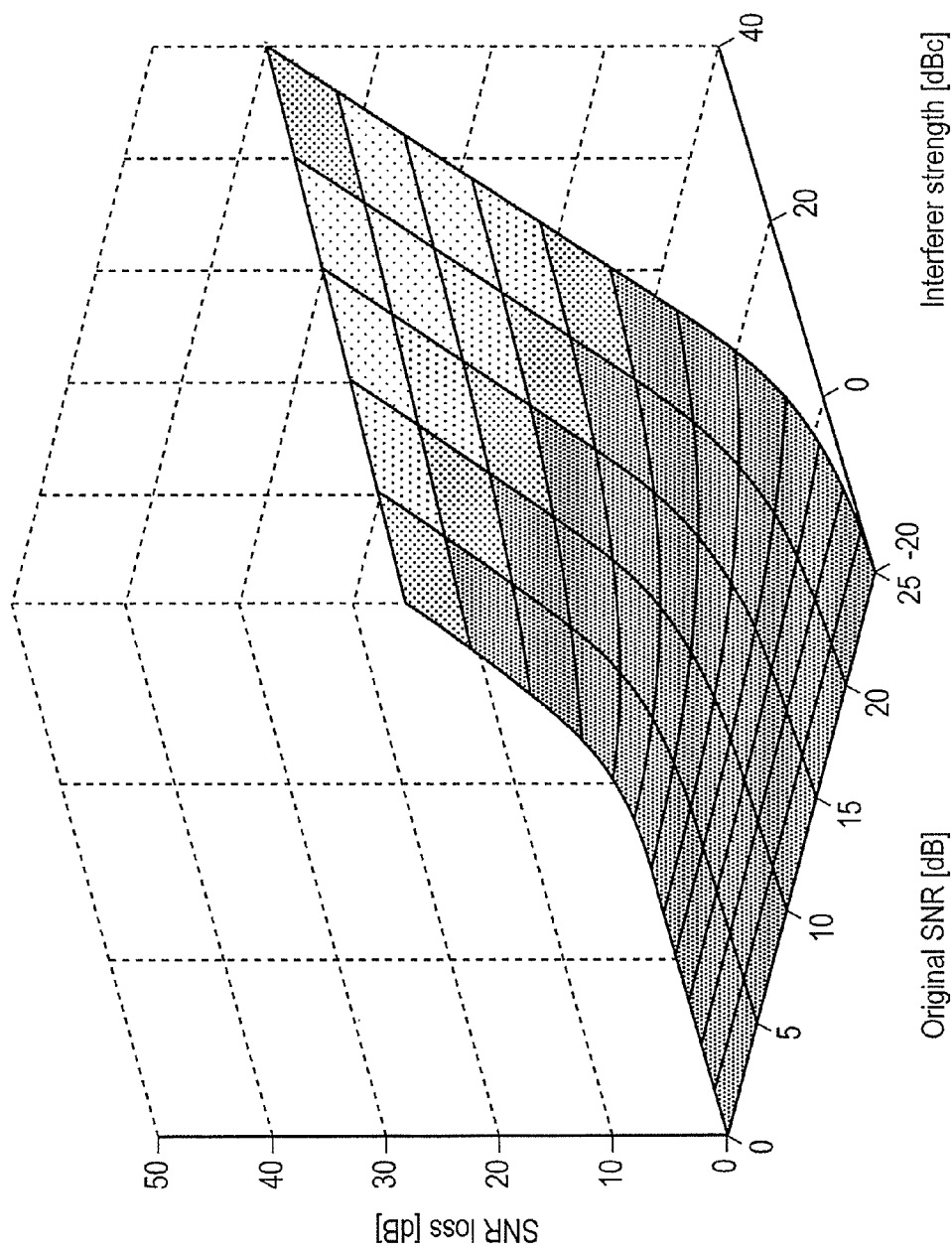
FIG. 4 is a graph illustrating signal-to-noise ratio (SNR) loss dependent on interferer strength.

However, the CQI is a fast measurement that is affected by the fast fading. Hence the NodeB does not have the possibility to differentiate between a particularly unfortunate fading hole and the presence of a strong interferer. In order to be able to differentiate between the two cases the NodeB would need to average over multiple CQI reporting. However the coherence time of the channel may be high, particularly in 3 km/h scenarios, which would require a large amount of averaging. FIG. 4 shows the SNR loss as a function of the nominal SNR and the offset between the interference level and the wanted carrier power. It can be seen that at high SNR the SNR loss increases dramatically even for small level of adjacent interference. Hence, at high SNR, rapidly the presence of an interferer may induce a drop in the reported CQI level for that carrier.

Figure 5:
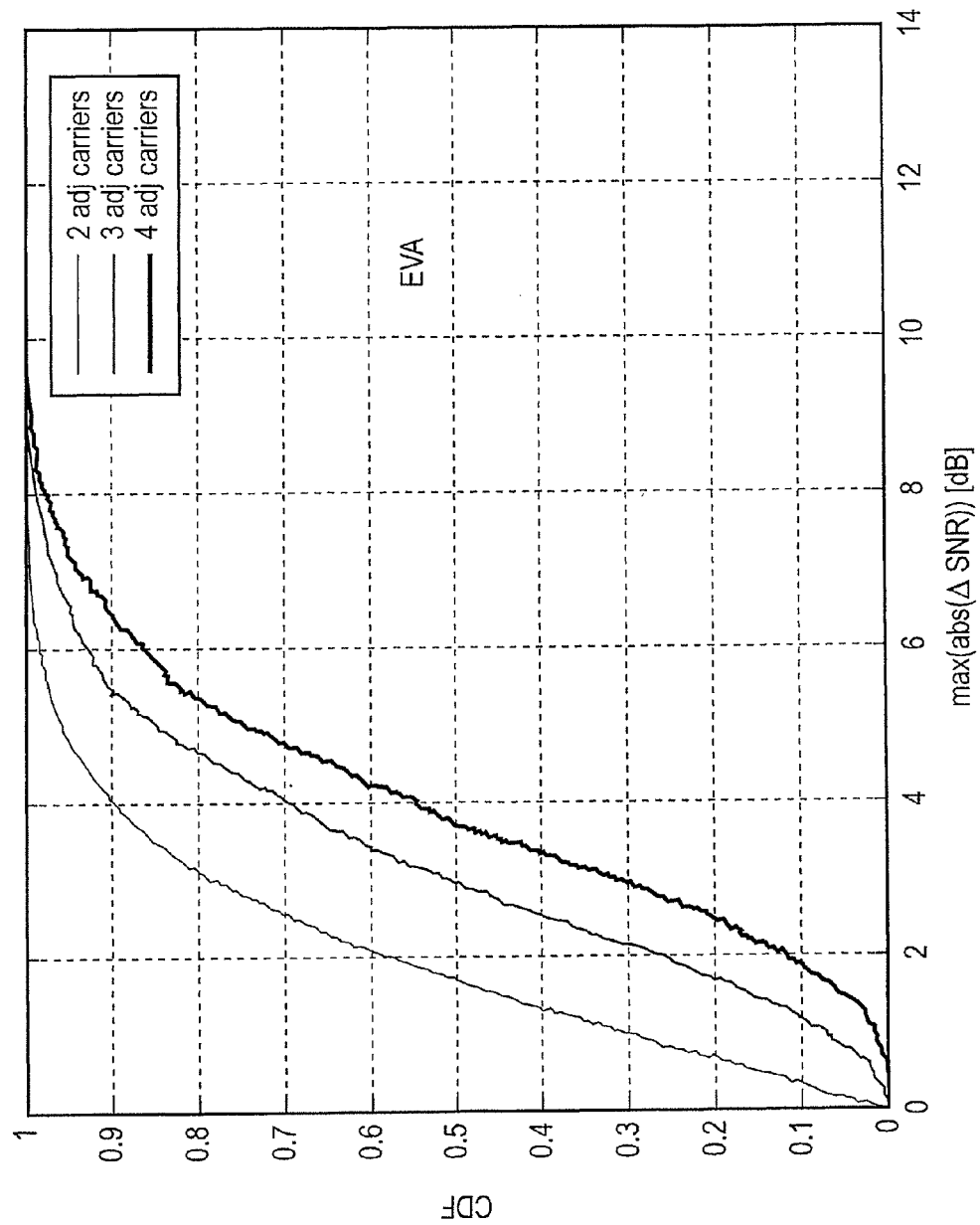
FIG. 5 is a graph of a cumulative probability density function (CDF) of the dynamic range of SNR for an Extended Vehicular A channel model.
Figure 6:
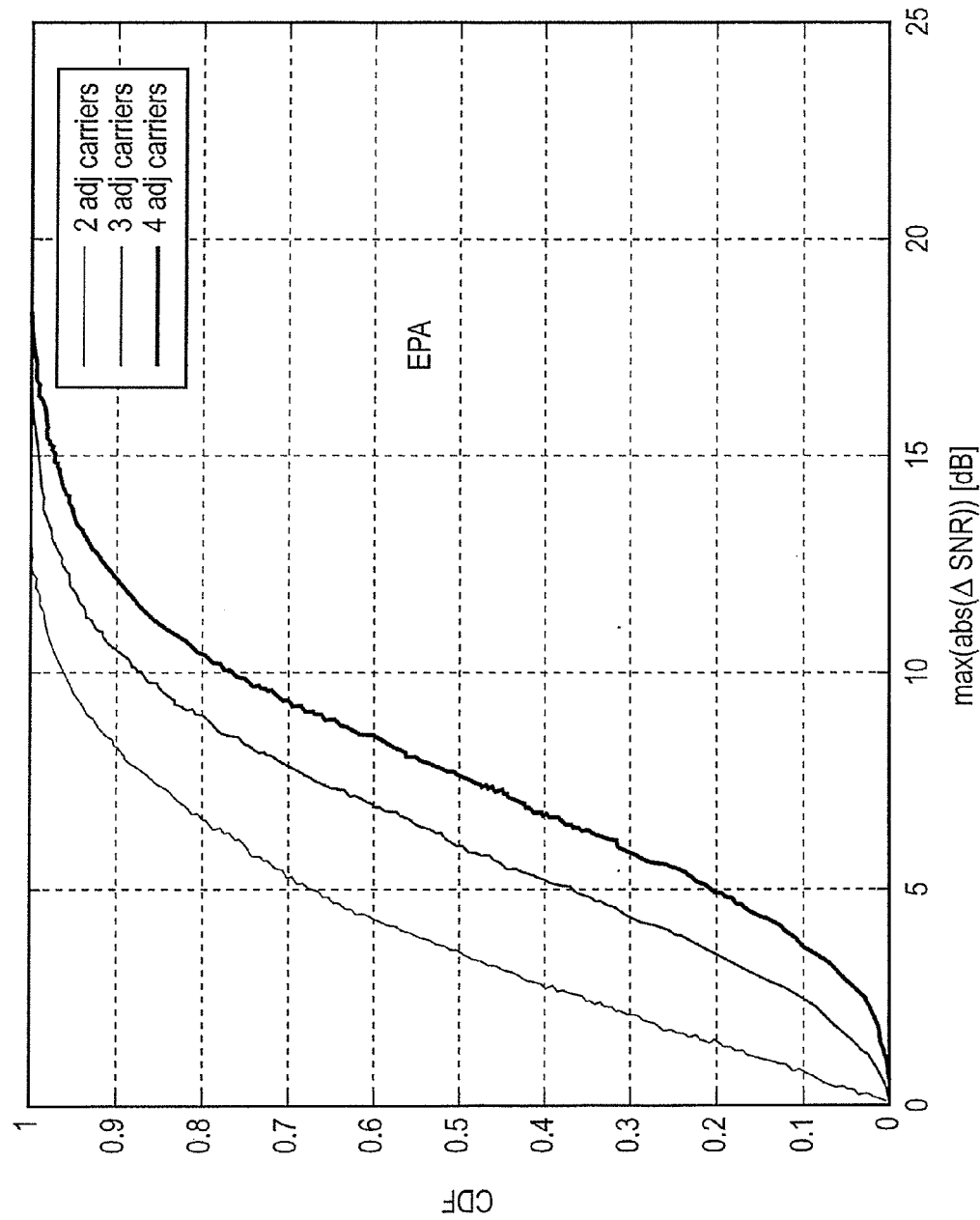
FIG. 6 is a graph of a CDF of the dynamic range of SNR for an Extended Pedestrian A channel model.

Additionally, FIGS. 5 and 6 show the CDF of the dynamic range of the SNR when two, three or four carriers are aggregated for, respectively, the Extended Vehicular A (EVA) and Extended Pedestrian A (EPA) channel models. More specifically, the CDF is the cumulative density function of the maximum value of the absolute value of the difference between the lowest and the highest SNR, which is related to the difference in CQI values, for 2, 3 and 4 adjacent carriers. It can be seen that the dynamic range of the SNR increases when aggregating more and more spectrum as expected. It can also be seen that there is a 2 to 3 dB increase in the dynamic range of the SNR when aggregating three carriers. For example under EVA, 95% of the time the maximum difference in instantaneous SNR levels is less than 10 dB for a single carrier, and it becomes less then 13 dB when aggregating three carriers. This also mean that different carriers may experience a difference in CQI which corresponds to 13 dB, that is, carrier C1 could report CQI=$x_1$ while carrier C2 could report a CQI=$x_2$ where $x_2$-$x_1$ corresponds to 13 dB. This effect would be only due to fading.

It can still be possible to define thresholds that trigger the average processing in the NodeB in order to discover the presence of an interferer. If the interferer power is such that the reduction in the CQI is within the possible dynamic range of the SNR when aggregating three carriers, the NodeB cannot discriminate between the presence of the interferer and a fading hole. Consequently, the NodeB may conclude that the carrier is still providing a reasonable quality on average and that data can still be sent, because sooner or later the fading will provide better conditions. One possibility would be to trigger the average method in a NodeB if the CQI of some of the carriers is hitting a very low zone, less than a threshold, that is, if the performance on a certain carrier is bad, the NodeB may decide to deactivate some of the carrier. The averaging approach can give some indications about the unfortunate fading approach and the presence of an interferer. The base station can compare the statistic of the reported CQI on the different carriers and estimate the average CQI, which provides information about a long term bias that provides information about the presence of the interferer. The advantage of this method is that it does not require changes into the legacy network or UE behaviour, while the drawback is that the network may decide to de-active one of the carriers with a certain latency that depends on the channel coherence time.

The limiting factor of the CQI-based method is the latency, when the coherence time of the channel is high. In one approach, an event triggered RSSI reporting can be used in which the NodeB can trigger the reporting of the RSSI computed in the gap.

The RSSI is the total received power in a defined carrier. The information about the RSSI in the gap can provide information about the load in the gap. However, this does not provide the information about the effect of this interferer on the receiver itself. Other methodologies or other quantities can be computed in order to provide the correct information about the effect of the interferer in the gap.

One option would be to trigger the report of an additional CQI-like feedback computed on carriers C1, C2 and C3. The UE has the information about Whether or not there is an interferer in the gap
Whether or not this interferer has an effect The UE can compute the ideal CQI value that it would support if the interferer was not there. In case the UE has two LOs, the realistic CQI would be equal to the ideal CQI, which means that there is no impact on the receiver. In case the UE has one LO but no interferer is present, the realistic CQI would be equal to the ideal CQI, which means that there is no impact on the receiver. In the case the UE has one LO and there is an interferer present, the NodeB is informed about the difference between the realistic CQI and the ideal CQI. The NodeB can take actions and re-optimise the scheduling if necessary.

In order to compute the ideal CQI, the UE can re-use the same methodology explained in respect of Embodiment 1 and map the SNR difference onto a CQI table that is stored in a look up table in the UE. This allows the UE to compute the ideal CQI and to report it to the network. The algorithm could be as follows:

The UE computes the RSSI on the interferer carrier, $RSSI_{inter}$.

The UE computes the interference level leaking into one of the wanted carriers, depending on the position of the LO, by computing $D_{Noise}$=$RSSI_{inter}$–Image Rejection capability of its implementation.

The real SNR for the computation of the CQI is computed as $SNR_{real}$=$P_{wanted}$/(Noise+Interferer)

This SNR contains already the information about the interferer that leaks into the wanted carrier. In order to compute the ideal SNR the interferer component should be removed $SNR_{ideal}$=$P_{wanted}$/(Noise+Interferer–$D_{Noise}$)

The difference between the real SNR and the estimation of the ideal SNR can be computed as follows $\Delta_{SNR}$=$SNR_{ideal}$–$SNR_{real}$ This quantity $\Delta_{SNR}$ can be used and mapped into the CQI table in order to find the equivalent $CQI_{ideal}$.

Different embodiments are possible in order to report $CQI_{real}$ and $CQI_{ideal}$:

in one embodiment the UE uses code division multiplexing of order two in order to multiplex the two CQI values, in one embodiment the UE uses time division multiplexing in order to multiplex the two CQI values.

Capability Reporting

A UE supporting non-contiguous carrier aggregation (NC-CA), and especially a UE that uses a single receiver, may be required to perform specific measurements in order to determine the interference experienced by it. However all NC-CA capable UEs may not be able to perform these measurements. The network can therefore send measurement control configuration to all the UEs that are NC-CA capable. However all UEs may not report the requested measurements. Therefore a solution is required whereby the network can become aware of whether a particular UE can perform such measurements or not. This can be provided by the UE signalling its non-contiguous carrier aggregation measurement capability to the network node.

The non-contiguous carrier aggregation measurement mode or non-contiguous carrier aggregation measurement configuration mode implies that the UE supporting such measurement capability is capable of measuring one or more of the indicated carriers using the common RF front end, performing a joint type of measurement. This is applicable for UEs that intend to support the non-contiguous carrier aggregation with a single receiver and dual receiver.

In general the non-contiguous carrier aggregation measurement capability of the UE comprises performing one or more measurements on at least one of the at least two non-contiguous carriers using the RF front end or radio circuitry which will be used to support the non contiguous carrier aggregation. The UE with such capability can measure at least one of the at least two non-contiguous carriers such that the position of the LO or the centre frequency of the RF front end lies in the middle of the non-contiguous bandwidth.

The UE with such capability may further comprise measuring at least one of the at least two non-contiguous carriers at the same time or in parallel. This can be indicated by additional capability information.

The UE with such capability may further comprise measuring at least one of the at least two non-contiguous carriers using a single or a common measurement gap pattern. This can be indicated by additional capability information.

The UE with such capability may further comprise measuring several carriers in a joint way autonomously, that is, without any explicit request by the network, in a legacy single or multi carrier network, in order to reduce the number of measurement gaps it needs in order to perform the interfrequency legacy measurements or in order to improve the quality of the measurements.

The above disclosed UE capability is explained below with several examples. Consider a scenario where an operator has more than two carriers, which are non-contiguous, that is, there is at least one carrier belonging to another operator between the carriers.

Example 1

In a first, basic example the carriers can be: C1xC2, where carriers C1 and C2 belong to operator A and x carrier belongs to another operator e.g. operator B.

Example 2

In a second example the non-contiguous carriers are: C1 x C2 C3 x x x xC4, where carriers C1, C2, C3 and C4 belong to operator A and x carriers belong to any set of other operators e.g. all to operator B or a few to operator B and the remaining ones to operator C and so on. In Example 2, the UE is served by the radio network node, such as a RNC, base station (BS), eNodeB, NodeB, relay, donor node, or donor eNodeB, on carrier C4. The radio network node serving the UE would like to serve the UE on additional carriers, for example on carriers C1, C2 and C3. This may be required for instance if the UE has to receive more data, such as if the DL buffer in the radio network node is above threshold. In order to serve the UE on additional carriers the network node may have to configure or activate the UE to receive data on those carriers. Prior to configuration or activation of the carriers C1, C2, C3 the radio network node wants to determine the signal quality of a signal received by the UE from at least one of these carriers. The signal quality in each of the carriers is affected by the interference from carrier x, which belongs to another operator. However the radio network node does not have any knowledge about the interference level experienced by the UE because of the gap where another operator can send a strong signal. The leakage of signal from the other operator carrier x, if the signal is stronger, will deteriorate the quality of carriers C1, C2 and C3, although if the signal transmitted by the carrier x is weaker, then the signal quality of the carriers C1, C2 and C3 will not be degraded.

If the UE performs measurement using a legacy procedure, in which case it measures on each carrier separately, it cannot detect the presence or effect of the interferer on the measured carrier. Therefore the network node has to configure the UE to perform the measurements on carriers C1, C2 and C3 in a non-contiguous carrier aggregation measurement mode. To reduce signalling overheads, the UE may be requested to measure on at least one of these three carriers. For example, the UE may measure only on C1 or C2, but the network may indicate all the three carriers as the potential list of carriers that can be used for serving the UE. The non-contiguous carrier aggregation measurement mode or non-contiguous carrier aggregation measurement configuration mode implies that the UE will measure one or more of the indicated carriers using the common front end. In this case the LO or the centre frequency of the UE receiver is centred over a bandwidth spanning the entire block of non-contiguous carriers. In this example the non-contiguous carrier configuration bandwidth comprises of four carriers: C1 x C2 C3, for example 20 MHz in WCDMA. For example, even if the UE is requested to perform measurements on selected carriers, for example only on C1, it may still configure its RF front over a larger measurement bandwidth, such as 20 MHz. In this way the effect of interference from carrier x into C1 will be reflected in the measurement done on C1. In general, however, the UE may be requested to perform measurements on more than one carrier.

The non-contiguous carrier aggregation measurement mode capability can be expressed in terms of other configuration modes. This is further explained with the following examples:

Example 3

The UE can also indicate that it can measure in the non-contiguous carrier aggregation mode when configured in single carrier mode. For example, referring to FIG. 2A, it can be configured in C4. The network can configure and schedule this UE under non-contiguous carrier aggregation with configuration C1, C2, C3 with a gap between C1 and C2. Therefore it can measure on one or more of carriers C1, C2 and C3.

Example 4

Figure 7:
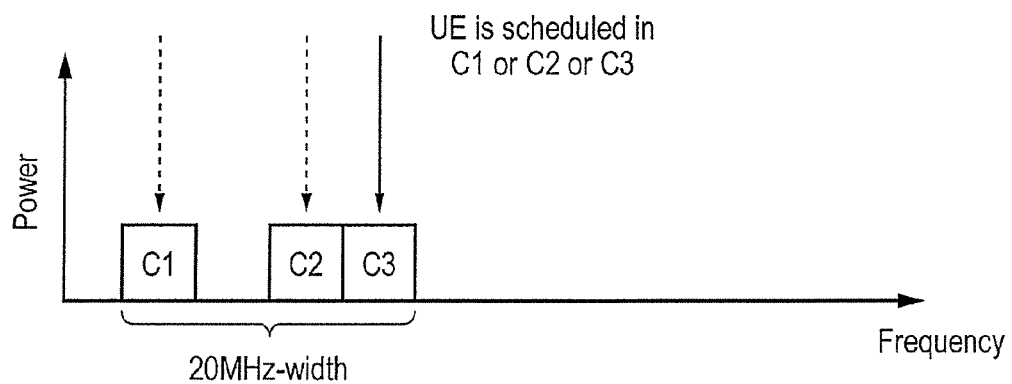
FIG. 7 illustrates a further carrier scenario.

The UE can also indicate that it can measure in the non-contiguous carrier aggregation mode when configured in single carrier in any of carriers, such as C1 or C2 or C3 in FIG. 7, belonging to a non-contiguous block of carriers.

Example 5

Figure 8:
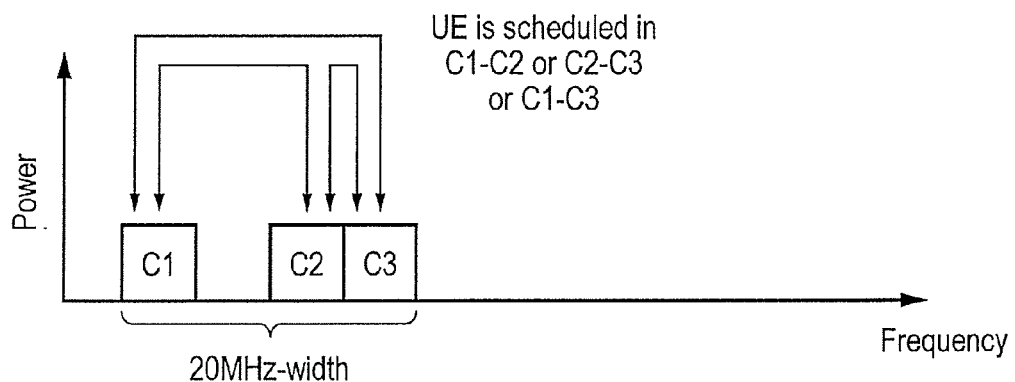
FIG. 8 illustrates a dual carrier scenario.

The UE can also indicate that it can measure in the non-contiguous carrier aggregation mode when configured in dual carrier or multi-carrier mode. For example, referring to FIG. 8, the UE can be configured in a dual carrier contiguous mode, being scheduled in C2-C3, or in dual carrier non-contiguous mode, being scheduled in C1-C2 or C1-C3. Therefore in this configuration the UE can perform measurements on any of the carriers in the non-contiguous carrier aggregation mode.

Example 6

The UE can also indicate that it can measure in the non-contiguous carrier aggregation mode when configured in non-contiguous carriers. Referring to FIG. 3 as an example, the UE can perform measurements in the non-contiguous carrier aggregation mode when configured and scheduled under non-contiguous carrier aggregation C1, C2 and C3. Such measurement capability enables the UE to monitor its quality depending on the presence of a strong interferer.

The non-contiguous carrier aggregation measurement capability supported by the UE may comprise additional information and supported parameters in addition to the capabilities explained above. For example, certain UEs may support measuring on up to three non-contiguous carriers, whereas others may support measuring on up to four non-contiguous carriers. Examples of additional information may comprise one or more of the following:

- Size of a non-contiguous block of spectrum over which a UE can configure its RF front end when measuring on one or more carriers. The size may be expressed in MHz, for example 20 MHz, or in terms of number of carriers, for example 5 carriers.
- Number of carriers that can be measured in a non-contiguous block of spectrum, for example, three.
- Type of measurements which can be performed by the UE, for example system information (SI) reading, CPICH measurements, UTRA carrier RSSI for HSPA or RSRP, RSRQ for LTE.
- Information associated with measurement gap. For example, an indication of whether the UE needs gaps for such measurements or not can be part of capability information. In case it needs gaps, then the type of gaps required for performing measurements is needed, for example, if the UE can use a single measurement gap pattern, also known as "compressed mode gap pattern", to perform the measurements on all indicated carriers. This may be a special gap pattern, which is different compared to the legacy pattern in that it is used only for measuring on carriers in a non-contiguous block of spectrum.

All non-contiguous carrier aggregation capable UEs may not support the above indicated measurement capabilities. Furthermore, if the UE supports such capability, then it may also indicate additional information, such as that it supports a specific set of parameters associated with the non-contiguous carrier aggregation measurement mode as listed above.

Hence the UE reports its measurement capability to the network node, for example RNC in HSPA or eNodeB in LTE. Then the network can use the received capability information to select the appropriate parameters for measurement configuration and send the request for measurements to the UE.

The target node receiving the above UE measurement capability can be any serving radio network node or core network node or even a positioning node. Examples of the radio network node are eNodeB, NodeB, RNC, relay, base station, donor node, for example Donor NodeB (DeNB). Examples of a core network node are Mobility Management Entity (MME) and access gateway. Examples of positioning node are any location server, and Evolved Serving Mobile Location Centre (E-SMLC).

The method of receiving the UE measurement capability information can also be implemented in a test system that comprises at least test equipment (TE) node, also known as a system simulator (SS). The test system can use this for testing purposes for verifying that UE supports this feature or capability of frequency specific autonomous gaps for SI reading. For example the test can be a signalling, protocol or procedure test case, or a performance or Radio Resource Management (RRM) test case to verify the UE capability. The signalling of capability to any of the above network nodes can be done using any suitable protocols such as Radio Resource Control (RRC) or LTE Positioning Protocol (LPP).

The UE may report its non-contiguous carrier aggregation measurement capability to the network node in any of the following ways:

- Proactive reporting without receiving any explicit request from the network node.
- Reporting upon receiving any explicit request from the network node. The explicit request can be sent by the network at anytime. For example the request for the capability reporting can be sent during initial setup or after handover.

In case of proactive reporting the UE may report its carrier frequency specific autonomous measurement gap capability during one or more of the following occasions:

- During initial setup or call setup, for example when establishing the RRC connection.
- During cell change, for example during handover, RRC re-establishment, or RRC connection release with re-direction.
- Periodic reporting Typically the first radio network node will receive the UE measurement capability information. Similarly the first radio network node will typically send the request to the UE for reporting its measurement capability via RRC signalling or any other relevant protocol such as LPP. Examples of the first network node are: RNC in HSPA, eNodeB in LTE, relay node, positioning node in LTE.

Configuring Measurements

The network may configure measurements in the non-contiguous carrier aggregation measurement mode based on received capability information. More particularly, the network node may use the received capability information from the UE to decide the measurement configuration parameters for sending a measurement request to the UE. For example the network may select a specific number of carriers, for example three carriers, for the UE to measure in the non-contiguous carrier aggregation measurement mode. Similarly the network may also configure the gap and the type of gap pattern, for example a single gap pattern, for the UE to perform such measurements in accordance with the UE reported measurement capability information. This is further elaborated with the examples of the measurement configuration parameters that are described below.

For example the network node may send explicit or detailed information about at least two non-contiguous carriers on which the UE should perform measurement on at least one carrier in non-contiguous carrier aggregation measurement mode. The information may comprise one or more of the following:

- Size of non-contiguous block of spectrum over which UE configures its RF front end when measuring on one or more carriers. The size may be expressed in MHz, for example 20 MHz, or in terms of number of carriers, for example five carriers.
- Number of carriers to be measured in non-contiguous block of spectrum, for example three.
- Uplink (UL) and/or Downlink (DL) channel numbers of carriers to be measured, for example UTRA Absolute Radio Frequency Channel Number (UARFCN) in HSPA, or Evolved Absolute Radio Frequency Channel Number (EARFCN) in LTE.
- Type of measurements for each carrier, for example cell identification, SI reading, CPICH measurements, UTRA carrier RSSI for HSPA, or RSRP, RSRQ for LTE.
- Format of reported results, for example whether the UE should report the complete measurement results, such as CPICH measurement results, or an indicator in terms of distinct levels or both formats.

Receiving node for measurement results, for example whether the UE should report results to the first radio network node, such as a RNC, eNodeB or positioning node, or a second radio network node, such as a NodeB, or both.

Measurement mode indication: an identifier to indicate the non-contiguous carrier aggregation measurement mode.

Reporting mechanism, for example periodical, event triggered or event-triggered periodical reporting.

Measurement gap information, for example single measurement gap pattern, also known as "compressed mode gap pattern", to be used for measurements on all indicated carriers. This may be a special gap pattern, which is different compared to the legacy pattern in that it is used only for measuring on carriers in non-contiguous block of spectrum.

Typically the first radio network node sends the measurement configuration information to the UE. The UE, upon receiving the measurement configuration or associated information from the serving radio network node, for example the first network node, performs the one or more measurements on the indicated carriers in non-contiguous carrier aggregation measurement configuration mode. The UE then performs the indicated measurement, for example CPICH Ec/No, UTRA carrier RSSI, RSRP, RSRQ, or SI reading, in accordance with the received configuration, for example bandwidth (BW) over which it should configure its LO, or use of measurement gaps. The UE, after performing the measurements, will report the measurement results to the first network node.

The first radio network node may also signal the received UE measurement capability information to the second radio network node. For example in HSPA the first node, such as a RNC, can signal this information to the second node, such as a NodeB, over an Iub interface. In HSPA the RNC can also signal the above-indicated UE capability information to another RNC over an Iur interface, which is an interface that connects RNCs. Similarly in LTE the first network node, such as a serving eNodeB, may send the above information to a neighbouring eNodeB over an X2 interface. The receiving eNodeB may use this information during or after the cell change, for example during handover, primary cell change or primary carrier change. The first radio network node may also signal the UE capability information to other nodes such as a positioning node, for example to an Evolved Serving Mobile Location Centre (E-SMLC) in LTE using the LTE positioning protocol annex (LPPa), to a Minimisation of Drive Tests (MDT) node, to Self Organising Network (SON) nodes, to an Operational and Maintenance (O&M) node, to an Operational Support System (OSS) node or to a network monitoring node.

The non-contiguous carrier aggregation measurement mode or non-contiguous carrier aggregation measurement configuration mode may also be pre-defined. For example, it may be pre-defined that for measuring on non-contiguous carriers the UE shall use the common receiver or common RF front end or that the LO of the UE RF receiver is centred at the centre of the bandwidth of all carriers in a non-contiguous set of carriers. It may also be predefined that the UE may use the non-contiguous carrier aggregation measurement configuration mode for measurements provided one or more of the following conditions are met:

UE is configured in single carrier mode or in Dual Cell-HSDPA mode, in which two adjacent carriers are aggregated.

The number of carriers to be measured is limited to N, where for example N=2.

The total bandwidth of all the carriers in a non-contiguous set of carriers or block of spectrum is limited to Bmax MHz, for example 20 MHz, and/or M carriers, for example four carriers.

At least one carrier within Bmax or M set of carriers belonging to another operator, for example one or two out of four carriers belong to another operator.

Performing Measurements

The UE, upon receiving the measurement configuration or associated information from the serving radio network node, for example the first network node, performs the one or more measurements on the indicated carriers in the non-contiguous carrier aggregation measurement mode. The UE may configure its RF front end in the non-contiguous carrier aggregation measurement mode, as described above, by using the received information via signalling and/or in accordance with one or more pre-defined rules as described above. For example, a control unit in the UE will adjust the LO of the receiver to a wider bandwidth to cover all indicated carriers, or to the bandwidth explicitly indicated by the network, or to the pre-defined bandwidth according to the pre-defined rule. The UE then performs the indicated measurement, for example CIPCH Ec/No, UTRA carrier RSSI, RSRP, RSRQ, or SI reading.

The UE, after performing the measurements, reports the measurement results to the first radio network node, for example CIPCH measurements to RNC in HSPA, RSRP/RSRQ to eNodeB in LTE, RSRP/RSRQ to positioning node in LTE, according to the configured measurement method. The UE may even report the measurement results to the second radio network node, for example NodeB or base station in HSPA. The second radio network node performs scheduling of data to the UE. For example, the UE may even report results to the second radio network node in the form of an indicator for each carrier to reduce the signalling overheads. The indicator may be used to indicate the quality in distinct levels. For example, there can be three levels: low, medium and high or poor, acceptable and good. The low or poor level for a carrier, for example C1, means there is a strong interferer deteriorating the quality of signal on carrier C1. The UE may even signal the measurement results to the first radio network node, for example RNC or eNodeB, in the form of an indicator described above.

Selecting Carriers

The first radio network node and/or second radio network node receives the measurement results from the UE as explained above. If only the first radio network node receives the results then it decides whether to select one or more carriers for scheduling the UE. The selection is based on the received results. For example, if the quality of measurement, for example RSSI in UTRA, done on a certain carrier, for example C1, is above a threshold, then the first radio network node selects that carrier for scheduling the UE. Another criterion for selection is based on measurement results expressed in terms of discrete levels. For example, the carrier whose signal quality is good or high, as indicated by the UE, will be selected by the first radio network node. In case K carriers can be selected for scheduling, but only L, where L is less than K, are required for scheduling data to the UE, then the first radio network node may select only L of K carriers with the best signal quality and/or levels.

If the second radio network node receives measurement results from the UE then the second radio network node may even select the carrier using the same criterion as used by the first radio network node as described above.

The first radio network node may also configure the UE or inform the UE if already configured about the selected carriers.

The first radio network node may also signal information about the selected carriers to the second radio network node. For example, in HSPA the first node, for example RNC, can signal this information to the second node, for example NodeB, over an Iub interface. Similarly, in LTE, the first network node, for example serving eNodeB, may send the above information to a neighbouring eNodeB over an X2 interface. The receiving NodeB may use this information during or after the cell change, for example handover, primary cell change, or primary carrier change. The first radio network node may also signal the information about the selected carriers to other nodes such as a positioning node, for example to E-SMLC in LTE using LPPa, MDT node, SON nodes, O&M node, OSS node or network monitoring node.

Using Capability Information

The first and/or second network nodes, or any other network node, may use the UE capability information for one or more radio network operation or RRM tasks. The first and/or second network nodes, or any other network node, may use also the UE reported measurement results based on UE received capability and measurement configuration for performing one or more radio network operation or RRM tasks. The examples of radio network operation or RRM tasks are:

Scheduling data

Mobility, for example cell change

Load balancing

Interference mitigation, avoidance and control

Network planning and management related tasks, for example tuning and configuration of radio network parameters For example, the network can use other network based methods, for example via signalling between network nodes, for determining interference in gaps if non-contiguous CA operation is used but if there are few UEs supporting this measurement capability. Similarly the second radio network node may use this information when scheduling the UE, for example NodeB in HSPA. In LTE the first and second radio network nodes are the same in which case the eNodeB may use this information when scheduling the UE. The first node may also use this information for loading balancing. The MDT and/or SON node may use this information for network optimization or planning. The positioning node may use this information for positioning the UE and improving the positioning accuracy. For example this can be achieved by configuring the UE for doing measurement according to their capability and according to the configuration which is best suited for certain scenarios.

Wireless Communication Apparatus

Figure 9:
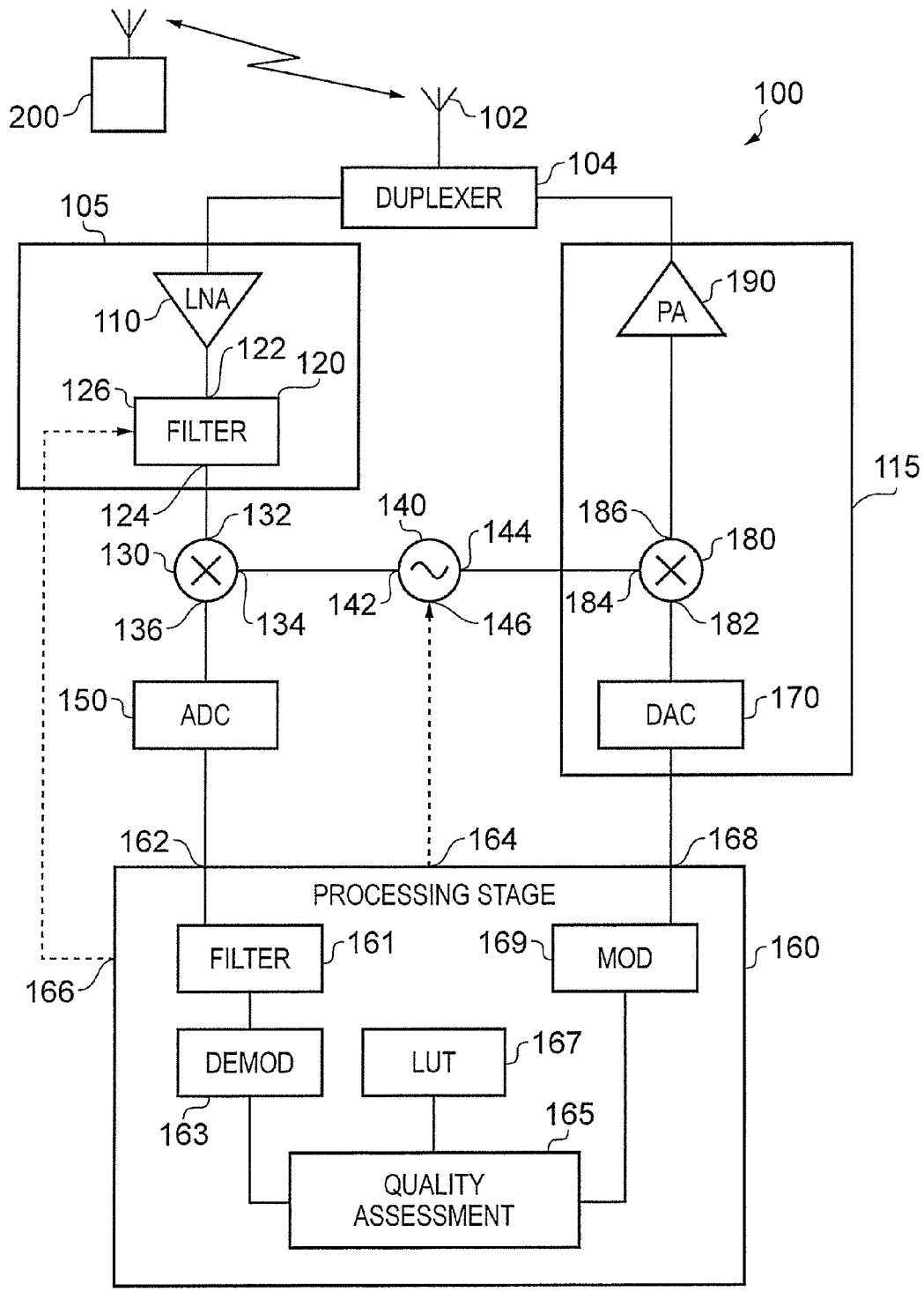
FIG. 9 is a block schematic diagram of a wireless communication apparatus in communication with a network node such as a NodeB base station.

Referring to FIG. 9, a wireless communication apparatus 100, which may be, for example, a mobile terminal such as a user equipment, is in communication with a network node 200, such as a NodeB base station. The wireless communication apparatus 100 comprises an antenna 102 coupled, by means of a duplexer 104, to an input of a low noise amplifier (LNA) 110 for amplifying a received RF signal delivered from the antenna 102. An output of the LNA 110 is coupled to a signal input 122 of a first filter 120 which is an RF filter for filtering the RF signal. The first filter 120 has bandpass characteristic with a variable bandwidth and a variable centre frequency. The LNA 110 and the first filter 120 are elements of a receiver front end 105.

An output 124 of the first filter 120 is coupled to a first input 132 of a down-conversion mixer 130. A second input 134 of the down-conversion mixer 130 is coupled to a first output 142 of a local oscillator 140. The local oscillator 140 generates a down-conversion local oscillator signal at a down-conversion local oscillator frequency $f_{LO}$ and this is delivered to the second input 134 of the down-conversion mixer 130. The down-conversion mixer 130 multiplies the filtered RF signal by the down-conversion local oscillator signal to provide, at an output 136 of the down-conversion mixer 130 a down converted signal, which can also be referred to an intermediate frequency (IF) signal. The down-converted signal may be at a relatively low frequency, for example in the order of hundreds of kHz, in which case the down-converted signal is a low IF signal, or may be at zero frequency (DC), in which case the down-converted signal is a baseband signal, also referred to as a zero IF signal. The output 136 of the down-conversion mixer 130 is coupled to a signal input 162 of a processing stage 160 by means of an analogue-to-digital converter (ADC) 150 which digitises the low IF signal or baseband signal.

The processing stage 160 comprises a second filter 161 having an input coupled to the input 162 of the processing stage 160. An output of the second filter 161 is coupled to an input of a demodulator 163. An output of the demodulator 163 is coupled to a signal input of a quality assessment stage 165. An output of the quality assessment stage 165 is coupled to an input of a modulator 169, and an output of the modulator 169 is coupled to a signal output 168 of the processing stage 160. The processing stage 160 also comprises a look-up table (LUT) 167 coupled to the quality assessment stage 165. A first control output 166 of the processing stage 160 is coupled to a control input 126 of the first filter 120 for controlling the centre frequency and bandwidth of the first filter 120. A second control output 164 of the processing stage 160 is coupled to a control input 146 of the local oscillator 140 for controlling the frequency of the local oscillator signal.

The signal output 168 of the processing stage 160, for delivering a signal for transmission, is coupled to a first input 182 of an up-conversion mixer 180 by means of a digital-to-analogue converter 170. A second input 184 of the up-conversion mixer 180 is coupled to a second output 144 of the local oscillator 140. The local oscillator 140 generates an up-conversion local oscillator signal and this is delivered to the second input 184 of the up-conversion mixer 180. The up-conversion mixer 180 multiplies the signal for transmission by the up-conversion local oscillator signal to provide, at an output 186 of the up-conversion mixer 180 an up-converted signal at a radio frequency. The output 186 of the up-conversion mixer 180 is coupled, by means of a power amplifier (PA) 190 and the duplexer 104, to the antenna 102 for transmission of the up-converted signal. The DAC 170, up-conversion mixer 180 and the PA 190 are elements of a transmitter 115.

By way of an example, the operation of the wireless communication apparatus 100 as a mobile terminal in scenario B of FIG. 1, with a carrier configuration C-5-CC, is described below with reference to the spectra illustrated in FIGS. 10 and 12 and the flow chart of FIG. 11. Referring to FIG. 9, the wireless communication apparatus 100 is initially receiving from a base station an initial carrier signal 320 which is assigned a bandwidth BW, which in this example is 5 MHz, at a centre frequency $f_{ICS}$. In this example, the down-conversion local oscillator signal is considered to be equal to the centre frequency $f_{ICS}$ of the initial carrier signal 320 in this initial condition, and therefore the initial carrier signal 320 after down-conversion by the down-conversion mixer 130 is centred at zero frequency, that is, DC. Also in this initial condition the bandwidth of the first filter 120 is 5 MHz, also centred at the centre frequency $f_{ICS}$ of the initial carrier signal 320.

Figure 11:
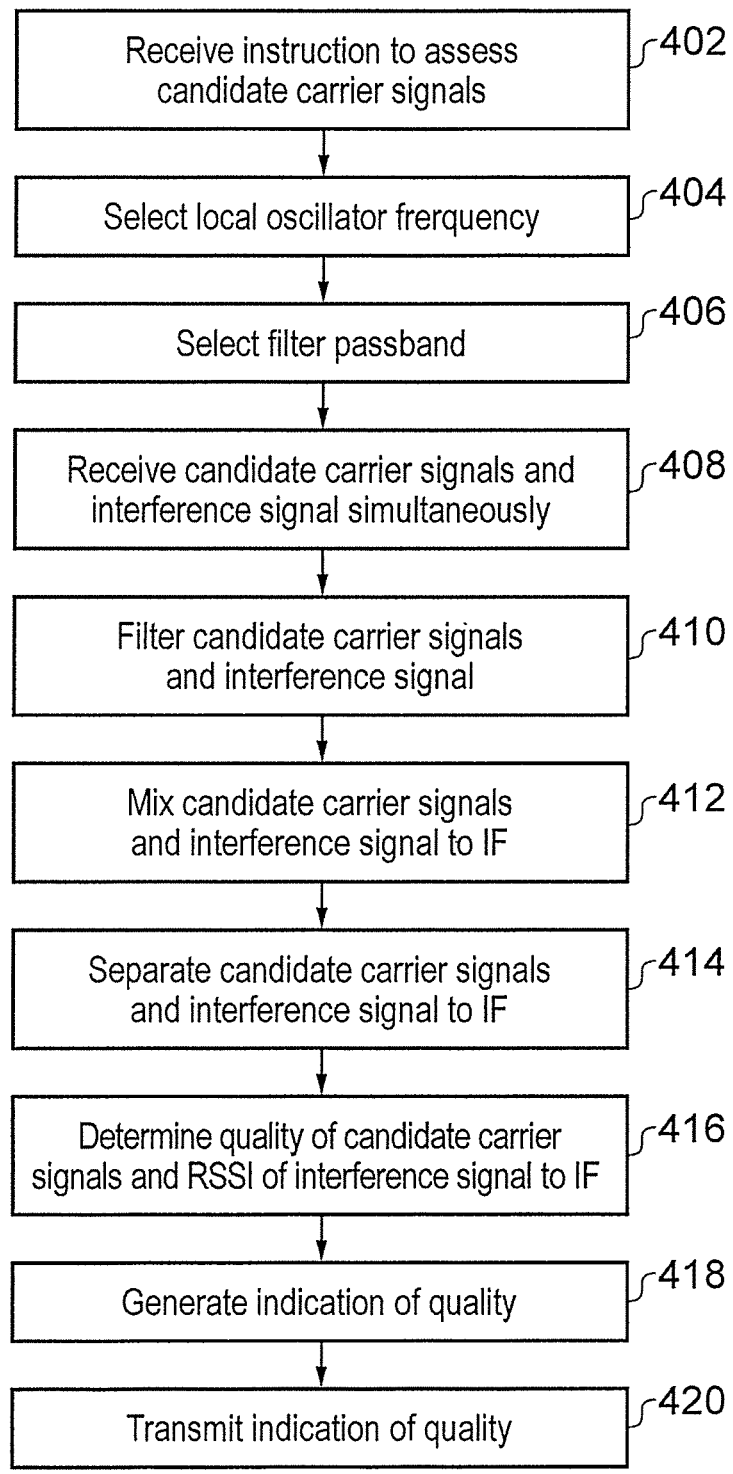
FIG. 11 is a flow chart of a method of operating a wireless communication apparatus.
Figure 12:
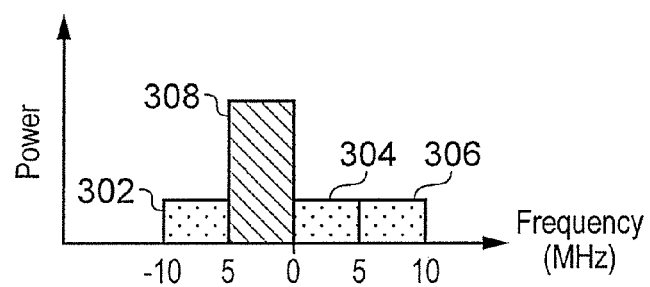
FIG. 12 illustrates a spectrum of an IF signal.

Referring to FIG. 11, at step 402, the wireless communication apparatus 100 receives an instruction, which is demodulated by the demodulator 163, from the base station on the initial carrier signal 320, to commence assessment of the quality of three carrier signals as candidates for use in carrier aggregation. The wireless communication apparatus 100 commences the quality assessment in response to the received instruction. In a variation of this example, the wireless communication apparatus 100 may autonomously commence assessment of the quality of the three carrier signals as candidates for use in carrier aggregation, without being instructed. The quality assessment may be performed, for example, during a pre-determined quality assessment time period, known to both the wireless communication apparatus 100 and the base station, to ensure that the wireless communication apparatus 100 does not miss information transmitted to it by the base station.

In this example, the three candidate carrier signals are, in order of ascending frequency, a first carrier signal 302 having a first centre frequency $f_1$, a second carrier signal 304 having a second centre frequency $f_2$ and a third carrier signal 306 having a third centre frequency $f_3$. The first, second and third carrier signals 302, 304, 306 are each assigned a bandwidth of 5 MHz, and are modulated, but alternatively need not be modulated at the time of the quality assessment. The first and second carrier signals 302, 304 are non-contiguous, the first and second centre frequencies $f_1$, $f_2$ being spaced apart by a gap of 5 MHz. An interference signal 308 is present in the gap, and is illustrated in FIG. 10 as having a relatively high level in comparison to the first, second and third carrier signals 302, 304, 306. The second and third carrier signals 304, 306 are contiguous, the second and third centre frequencies $f_2$, $f_3$ being spaced apart by 5 MHz.

At step 404 of FIG. 11, the processing stage 160 returns the down-conversion local oscillator frequency $f_{LO}$, by means of the control input 146 of the down-conversion local oscillator 140, to a frequency that is midway between the candidate carrier signal having the lowest centre frequency, that is, the first centre frequency $f_1$, and the candidate carrier signal having the highest centre frequency, that is, the third centre frequency $f_3$. Therefore, in this example, the down-conversion local oscillator signal, referenced 312 in FIG. 10, is tuned to a frequency that is on the boundary between the gap where the interference signal 308 is located and the second carrier signal 304.

At step 406, the processing stage 160 adjusts the bandwidth of the first filter 120, by means of the control input 126 of the first filter 120, to span all three of the candidate carrier signals. Consequently, the passband of the first filter 120 extends from the lowest frequency occupied by the first carrier signal, that is, 2.5 MHz below the first centre frequency $f_1$, to the highest frequency occupied by the third carrier signal, that is, 2.5 MHz above the third centre frequency $f_3$. This passband has a bandwidth of 20 MHz and is depicted in FIG. 10, referenced 310. The bandwidth of the first filter 120 may alternatively be adjusted to encompass a wider range of frequencies, including frequencies below $f_1$-2.5 MHz and/or above $f_3$+2.5 MHz, although this wider bandwidth will allow more noise to be passed through the first filter 120.

After adjustment of the down-conversion local oscillator frequency $f_{LO}$ and the bandwidth of the first filter 120, at step 408 the first, second and third carrier signals 302, 304, 306 and the interference signal 308 are received simultaneously. At step 410, the first, second and third carrier signals 302, 304, 306 and the interference signal 308 are filtered by the first filter 120 and at step 412 are down-converted simultaneously by the down-conversion mixer 130. After down-conversion, the combined spectrum of these signals is centred at DC, as depicted in FIG. 12, with the first carrier signal 302 and the interference signal 308 occupying negative frequencies, and the second and third carrier signals 304, 306 occupying positive frequencies.

At step 414, the second filter 163 performs further filtering to separate each of the candidate carrier signals and the interference signal, using complex filtering techniques to separate positive and negative frequencies. The separated first, second and third carrier signals 302, 304, 306 and the interference signal 308 are passed to the quality assessment stage 165 via the demodulator 163.

At step 416 the quality assessment stage 165 determines a quality of each of the candidate carrier signals. The quality of each of the candidate carrier signals may be determined as, for example, a received signal strength indication (RSSI) or a signal-to-noise ratio, such as the energy per symbol or per chip ($E_C$) divided by a noise plus interference energy density ($N_0$), that is, $E_C/N_0$. As a further option, the quality of each of the candidate carrier signals may be determined as a combination of an RSSI and a signal-to-noise ratio.

Because the mixer 130 mixes down more than one signal simultaneously, in particular the three candidate carrier signals and the interference signal, the images of these signals may be mixed into the baseband frequency range occupied by other ones of the signals. For example, an image of the interference signal 308 may be mixed into the baseband range of frequencies occupied by the second carrier signal 304, and vice versa, and an image of the first carrier signal 302 may be mixed into the baseband range of frequencies occupied by the third carrier signal 306, and vice versa. Although the image rejection capability of the mixer 120 can reduce the impact of the image signals, the image signals may nevertheless affect the assessment of quality of the candidate carrier signals, particularly an image of the interference signal 308 which may be at a higher level than the candidate carrier signals. For example, an image signal can increase an RSSI by causing a candidate carrier signal to appear to have a higher level than it actually has. Conversely, a signal to noise measurement may appear worse than it may actually be if, following the quality assessment, only a subset of the candidate carrier signals is selected for communication purposes and the other candidate carrier signals are switched off, thereby reducing the number of image signals. Therefore, where the assessment of quality is distorted in this way, subsequent decisions based on the assessment of quality may be sub-optimum.

In order to compensate for the distortion of the assessment of quality due to an image of the interference signal, at step 418 an indication of carrier signal quality can be generated which reflects the presence of the image signals. More specifically, an indication of carrier signal quality is generated which is dependent on a determined quality of one of the candidate carrier signals and on a determined signal strength of the interference signal. A quality of a candidate carrier signal may be determined, at step 416, and then adjusted, at step 418, by an amount dependent on the determined signal strength of the interference signal. The magnitude of the adjustment may be dependent on an image rejection ratio of the wireless communication apparatus 100, and therefore the indication of carrier signal quality may be dependent on an image rejection ratio of the wireless communication apparatus 100. Expressing the determined RSSI of the interference carrier 308 as $P_{INT}$, where $P_{INT}$ is a value in, for example dBm, the power of the interference carrier 308, expressed in milli-Watts, is therefore $$10^{\frac{P_{INT}}{10}}.$$

Expressing the image rejection ratio of the wireless communication apparatus 100 as I, where I is a value in dB, the power from the image of the interference signal is $$10^{\frac{P_{INT}-I}{10}},$$

and this may be used as a compensation factor to take account of the presence of the image signal. Furthermore, expressing a determined RSSI of the candidate carrier signals 302, 304, 306 as $P_{Ci}$, where i=1, 2 or 3 for, respectively the first, second and third carrier signals, where $P_{Ci}$ has a value in dBm, the power in the frequency ranges occupied by the candidate carrier signals, which includes both the power of the first, second or third carrier signals and the power resulting from the image of the interference signal 308, expressed in milli-Watts, is $$10^{\frac{P_{Ci}}{10}},$$

for i=1, 2 or 3. Therefore, the power of the first, second or third carrier signals, discounting the power due to the image of the interference signal 308 may be determined as $$P_i = 10^{\frac{P_{Ci}}{10}} - 10^{\frac{P_{INT}-I}{10}},$$

where i=1, 2 or 3 for, respectively the first, second and third carrier signals. The compensation factor $$10^{\frac{P_{INT}-I}{10}}$$

may be applied each time the indication of carrier signal quality is generated or, for example, only if the RSSI of the interference signal 308, $P_{INT}$, exceeds a first threshold, and/or only if the RSSI of the respective candidate carrier signal, $P_{Ci}$, exceeds a second threshold.

Where the quality of the candidate carrier signals 302, 304, 306 is determined at step 416 as a signal-to-noise ratio, the indication of carrier signal quality, compensated to take account of the presence of the image of the interference signal 308, may be expressed as $$SNR_i = \frac{P_i}{\left(N_{Ci} + 10^{\frac{P_{INT}-I}{10}}\right)},$$

where $N_{Ci}$ is the determined receiver noise in the frequency range occupied by the respective candidate signals, and i=1, 2 or 3 for, respectively the first, second and third carrier signals.

As a further option, where the wireless communication apparatus 100 is required to transmit an indication of carrier signal quality based on another variable, for example a symbol error rate or an indication of an error rate, such as the channel quality indicator, CQI, in the LTE protocol, the quality assessment stage 165 may employ, at step 416 or 418, a look-up table to map an RSSI, a signal-to-noise ratio or other quantity to the required variable. For example, the look-up table 167 may be used to map an RSSI or a signal-to-noise ratio, or an indication of RSSI or a signal-to-noise ratio, to an indication of an error rate or a CQI value. In this case, at step 418, the quality assessment stage 165 generates the indication of carrier signal quality dependent on the indication of error rate or CQI value.

At step 420, the indication of carrier signal quality is passed to the transmitter 115 via the modulator 169 for transmission to the base station or a network node, which can employ the indication of carrier signal quality to select two or more of the candidate carrier signals for use in carrier aggregation. The wireless communication apparatus 100 may then revert to the initial condition of receiving the initial carrier signal 320 until the next assessment of quality is required.

In order to provide more information to the base station or network node on which to base the selection of carriers, and therefore improve the reliability of the selection, the wireless communication apparatus 100 may generate the indication of carrier signal quality at step 418 as a first indicator and a second indicator, where the first indicator is dependent on the determined quality of the candidate carrier signals, including the impact of the interference signal, and the second indicator provides information about the interference signal, and in particular is dependent on the determined RSSI of the interference and on the image rejection ratio of the wireless communication apparatus 100. For example, the second indicator may indicate the change in quality caused to the carrier signals by the interference signal, or equivalently, the second factor may indicate the predicted change in quality that can be expected if the interference signal were to be removed. Therefore, the second indicator may be, for example, indicative of the compensation factor. Alternatively, the second indicator may indicate a predicted quality of the carrier signals that can be expected if the interference signal were to be removed. The first and second indicators may be transmitted together in a single measurement time period, or the first indicator may be transmitted in one measurement time period and the second indicator may be transmitted in a different measurement time period.

Figure 13:
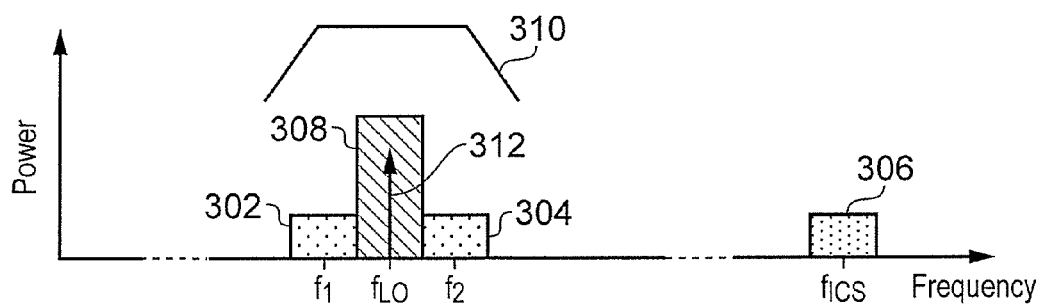
FIG. 13 illustrates another example of a spectrum of an RF signal.

Although examples have been described in which there are three candidate carrier signals, other numbers of candidate carrier signals may be employed. In particular, either an odd or even number of candidate carrier signals may be employed. An example RF spectrum for the case of two candidate carrier signals, these being the first carrier signal 302 and the second carrier signal 304, is illustrated in FIG. 13. The first carrier signal 302 and the second carrier signal 304 are spaced apart in the frequency domain by the interference signal 308, which is located in the gap between them. In this example, selecting the down-conversion local oscillator frequency $f_{LO}$ to be positioned centrally between the candidate carrier signal having the lowest centre frequency, that is, the first centre frequency $f_1$, and the candidate carrier signal having the highest centre frequency, that is, the second centre frequency $f_3$ positions the down-conversion local oscillator signal, referenced 312 in FIG. 13, at a frequency that is in the middle of the range of frequencies occupied by the interference signal 308. In other words, the down-conversion local oscillator signal 312 is positioned in the middle of the gap between the first carrier signal 302 and the second carrier signal 304. The resulting symmetry of the signals with respect to the down-conversion local oscillator signal can result in the image of the interference signal having a reduced impact, as the image of the interference signal 308 will mix, primarily, into the range of frequencies occupied by the interference signal 308 after down-conversion.

Although references have been made to positioning a local oscillator, that is, a local oscillator frequency, centrally or in the middle, it is to be understood that the accuracy of such positioning is subject to the accuracy of the local oscillator frequency.

Although examples have been described which employ a zero IF signal, in other words, direct conversion to DC, with the down-conversion local oscillator frequency $f_{LO}$ selected to be positioned centrally with respect to the combined spectrum of the candidate carrier signals 302, 304, 306 and the interference signal 308, alternatively a low IF signal may be employed, in which the down-conversion local oscillator frequency $f_{LO}$ is offset from this central position by an amount equal to the frequency of the low IF signal. Typically, the low IF signal may have a frequency of a few tens of kilohertz. Offsetting the down-conversion local oscillator frequency $f_{LO}$ from this central position can result in the image of the interference signal 308 being mixed into the frequency ranges occupied by more of the candidate carrier signals. Depending on the relative signal levels of the candidate carrier signals 302, 304, 306 and the interference signal 308, and on the image rejection capability of the wireless communication apparatus 100, this can reduce the degradation caused by the interference signal 308, by spreading the energy of the image signal into more of the candidate carrier signals 302, 304, 306, but at a lower level resulting in a relatively high quality assessment of the candidate carrier signals, or can increase the degradation caused by the interference signal 308, by spreading the energy of the image signal into more of the candidate carrier signals 302, 304, 306 but at a sufficiently high level to result in a relatively low quality assessment of the candidate carrier signals 302, 304, 306.

Figure 10:
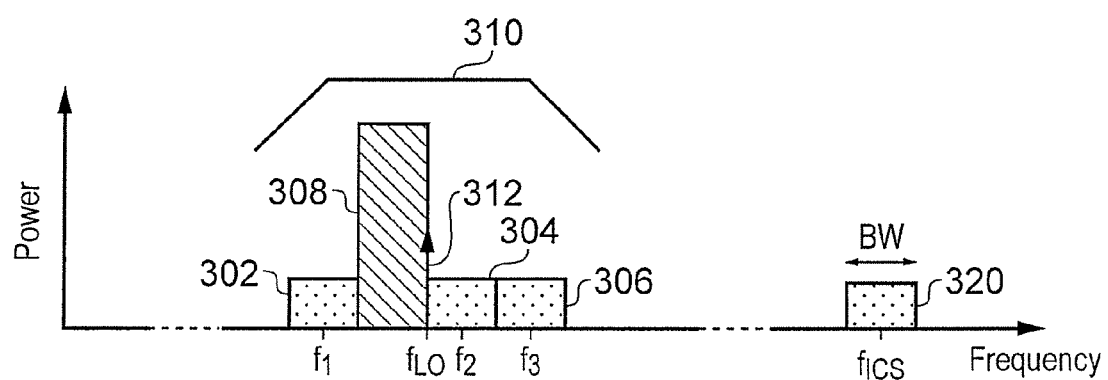
FIG. 10 illustrates a spectrum of an RF signal.

Although examples have been described in which the wireless communication apparatus 100 is initially receiving an initial carrier signal 320 having a centre frequency referenced as $f_{ICS}$ in FIGS. 10 and 13, prior to commencing the assessment of quality of the candidate carrier signals 302, 304, 306, this is not essential, and the assessment of quality may take place during ongoing communication using any or all of the candidate carrier signals. The assessment of quality in this circumstance may be required, for example, to check whether the candidate carrier signals are of sufficient quality for the ongoing communication or whether higher quality carrier signals should be sought, or to check whether the candidate carrier signals are available in a neighbouring cell at sufficient quality to permit handover.

Embodiments have been described in which a single interference signal 308 is present in a single gap between non-contiguous carrier signals. Nevertheless, the disclosure is applicable in circumstances where there is a plurality of different gaps, any or each containing an interference signal.

Examples have been described in which the wireless communication apparatus 100 is a mobile terminal, in which the assessment of quality is initiated by a received instruction, and in which the indication of carrier signal quality is transmitted by the wireless communication apparatus 100. None of these features are essential. For example, the wireless communication apparatus 100 may be a base station or node in a mobile communication network, the wireless communication apparatus 100 may initiate the assessment of quality, and the wireless communication apparatus 100 may employ the indication of carrier signal quality, for example for selecting carrier signals.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method of operating a user equipment for measuring non-contiguous carriers, the method comprising:
    changing a position of a local oscillator to be in a middle of the non-contiguous carriers;
    measuring the non-contiguous carriers simultaneously to generate a measurement;
    estimating a power level of an interferer in a gap in the non-contiguous carriers that creates image interference; and
    compensating the measurement dependent on the power level of the interferer and an image rejection factor.

2. The method as claimed in claim 1, wherein compensating the measurement comprise compensating the measurement conditional on the power level of the interferer being less than a first threshold.

3. The method as claimed in claim 1, wherein measuring the non-contiguous carriers comprises:
    calculating a joint power and energy-per-chip to noise-plus-interference ratio for the non-contiguous carriers; and
    computing a per-carrier power and energy-per-chip to noise-plus-interference ratio.

4. The method as claimed in claim 3, wherein:
    estimating the power level of the interferer comprises estimating the power level of the interferer that creates the image interference and computing a level of the image interference in one of the carriers; and
    compensating the measurement comprises subtracting the level of the image interference from the per-carrier power and energy—per-chip to noise-plus-interference of the one of the carriers.

5. The method as claimed in claim 4, wherein compensating the measurement comprises compensating the measurement conditional on a ratio of the power level of the interferer to the per-carrier power of the one of the carriers being less than a second threshold.

6. The method as claimed in claim 4, further comprising:
    computing a difference between a signal-to-noise ratio of the one of the carriers and an ideal signal-to-noise ratio of the one of the carriers with the image interference removed;
    mapping the difference into a channel quality indicator (CQI) table to find an ideal CQI value the user equipment would support if the interferer was not there; and
    informing a NodeB about a difference between a realistic CQI value and the ideal CQI value.

7. The method as claimed in claim 6, wherein informing the NodeB comprises reporting the realistic CQI value and the ideal CQI value to the NodeB when requested by the NodeB.

8. The method as claimed in claim 7, wherein the realistic CQI value and the ideal CQI value are multiplexed using code division multiplexing.

9. The method as claimed in claim 7, wherein the realistic CQI value and the ideal CQI value are multiplexed using time division multiplexing.

10. The method as claimed in claim 1, wherein measuring the non-contiguous carriers comprises measuring the non-contiguous carriers simultaneously during one measurement gap.

11. The method as claimed in claim 1, wherein the method is performed responsive to a request for the measurement received from a NodeB.

12. The method as claimed in claim 1, wherein the method is performed autonomously by the user equipment.

13. A user equipment configured to measure non-contiguous carriers, the user equipment comprising:
a receiver configured to receive the non-contiguous carriers;
a local oscillator;
a processing circuit configured to:
change a position of the local oscillator to be in a middle of the non-contiguous carriers;
measure the non-contiguous carriers simultaneously to generate a measurement;
estimate a power level of an interferer in a gap in the non-contiguous carriers that creates image interference; and
compensate the measurement dependent on the power level of the interferer and an image rejection factor.

* * * * *